(12) United States Patent
Gilbert et al.

(10) Patent No.: US 10,260,236 B2
(45) Date of Patent: *Apr. 16, 2019

(54) FRICTION FIT COMPOSITE COLUMN

(71) Applicant: Jack Walters & Sons, Corp., Allenton, WI (US)

(72) Inventors: Fredrick R. Gilbert, Fairfield, IL (US); Daniel Pederson, Fond du Lac, WI (US); Andrew Pritzl, Lodi, WI (US)

(73) Assignee: Jack Walters & Sons, Corp., Allenton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,552

(22) Filed: Apr. 25, 2018

(65) Prior Publication Data

US 2018/0238055 A1    Aug. 23, 2018

Related U.S. Application Data

(63) Continuation of application No. 15/606,519, filed on May 26, 2017, which is a continuation of application
(Continued)

(51) Int. Cl.
  *E04C 3/00*    (2006.01)
  *E04C 3/36*    (2006.01)
(Continued)

(52) U.S. Cl.
  CPC ............... *E04C 3/36* (2013.01); *E04B 1/2608* (2013.01); *E04B 1/40* (2013.01); *E04C 3/29* (2013.01);
(Continued)

(58) Field of Classification Search
  CPC ............... F16B 15/0069; F16B 15/003; F16B 2015/0076; F16B 15/0046; Y10T 403/551; E04C 3/36
(Continued)

(56) References Cited

U.S. PATENT DOCUMENTS

| 797,083 A | 8/1905 | Stowe |
| 1,402,304 A | 1/1922 | Lord |

(Continued)

FOREIGN PATENT DOCUMENTS

| CN | 203878751 U | 10/2014 |
| CN | 204023884 U | 12/2014 |
| WO | 2014187726 A1 | 11/2014 |

OTHER PUBLICATIONS

Perma-Column Brochure, Perma-Column, Inc., 2007.
(Continued)

*Primary Examiner* — Chi Q Nguyen
(74) *Attorney, Agent, or Firm* — Andrus Intellectual Property Law, LLP

(57) ABSTRACT

A composite assembly includes a series of elongated layers joined lengthwise thereof. At least two of the elongated layers each have an upper elongated portion and a lower elongated portion secured together in an end-to-end relationship at a joint therebetween by a connector arrangement. The upper elongated portion is constructed of a wood material, and the lower elongated portion is constructed of a non-wood material. The lower elongated portion may have a reinforcing rod therein.

20 Claims, 15 Drawing Sheets

Related U.S. Application Data

No. 15/363,576, filed on Nov. 29, 2016, now Pat. No. 9,719,257, and a continuation-in-part of application No. 14/962,022, filed on Dec. 8, 2015, now Pat. No. 9,528,265, which is a continuation-in-part of application No. 14/562,054, filed on Dec. 5, 2014, now Pat. No. 9,234,350.

(60) Provisional application No. 62/405,623, filed on Oct. 7, 2016, provisional application No. 61/912,681, filed on Dec. 6, 2013.

(51) Int. Cl.

| | | |
|---|---|---|
| *E04B 1/41* | (2006.01) | |
| *E04C 3/29* | (2006.01) | |
| *F16B 15/00* | (2006.01) | |
| *E04B 1/26* | (2006.01) | |
| *E04B 1/38* | (2006.01) | |
| *E04C 3/34* | (2006.01) | |
| *E04C 3/18* | (2006.01) | |
| *E04H 12/22* | (2006.01) | |
| *E04C 3/30* | (2006.01) | |
| *E02D 27/42* | (2006.01) | |
| *E04B 1/30* | (2006.01) | |

(52) U.S. Cl.
CPC .......... *F16B 15/0046* (2013.01); *E02D 27/42* (2013.01); *E02D 27/425* (2013.01); *E04B 1/30* (2013.01); *E04B 2001/2644* (2013.01); *E04B 2001/2672* (2013.01); *E04B 2001/2684* (2013.01); *E04B 2001/2692* (2013.01); *E04B 2001/405* (2013.01); *E04C 3/18* (2013.01); *E04C 3/30* (2013.01); *E04C 3/34* (2013.01); *E04H 12/2253* (2013.01); *E04H 12/2269* (2013.01); *E04H 12/2276* (2013.01); *F16B 2015/0076* (2013.01)

(58) Field of Classification Search
USPC .............. 411/457, 467, 461, 466, 468, 458; 403/293
See application file for complete search history.

(56) References Cited

U.S. PATENT DOCUMENTS

| | | | |
|---|---|---|---|
| 2,400,266 A * | 5/1946 | Soffer | F16B 15/0038 |
| | | | 217/69 |
| 2,877,520 A | 3/1959 | Jureit | |
| 3,090,088 A | 3/1963 | Foley et al. | |
| 3,172,171 A | 3/1965 | Knight | |
| 3,211,043 A * | 10/1965 | Sanford | E04B 1/49 |
| | | | 411/465 |
| 3,390,902 A | 1/1968 | Jureit | |
| 3,427,055 A | 2/1969 | Coovert | |
| 3,454,292 A | 7/1969 | Sanford | |
| 3,498,170 A | 3/1970 | Sanford | |
| 3,703,304 A | 11/1972 | Losee | |
| 3,841,195 A | 10/1974 | Jureit | |
| 3,846,303 A | 11/1974 | Duff | |
| 3,911,548 A | 10/1975 | Perry | |
| 4,157,676 A | 6/1979 | Jureit | |
| 4,299,511 A | 11/1981 | Demers | |
| 4,318,652 A | 3/1982 | Gore | |
| 4,336,678 A | 6/1982 | Peters | |
| 4,440,099 A * | 4/1984 | Brachet | F27D 1/02 |
| | | | 110/336 |
| 4,479,342 A | 10/1984 | Eberle | |
| 4,486,155 A | 12/1984 | Roca-Nierga | |
| 4,488,389 A | 12/1984 | Farmont | |
| 4,501,102 A | 2/1985 | Knowles | |
| 4,571,114 A | 2/1986 | Rionda et al. | |
| 4,586,550 A | 5/1986 | Kitipornchai | |
| 4,639,176 A | 1/1987 | Smith et al. | |
| 4,653,242 A * | 3/1987 | Ezard | B27F 7/155 |
| | | | 14/75 |
| 4,679,367 A | 7/1987 | Geisthardt | |
| 4,710,083 A | 12/1987 | Wolf | |
| 4,734,003 A | 3/1988 | Smith et al. | |
| 4,737,060 A | 4/1988 | Birckhead | |
| 4,738,071 A * | 4/1988 | Ezard | B27F 7/155 |
| | | | 227/82 |
| 4,833,859 A | 5/1989 | Wolf | |
| 4,887,952 A | 12/1989 | Wolf | |
| 5,006,006 A | 4/1991 | Lehtonen | |
| 5,048,256 A | 9/1991 | Thorsnes | |
| 5,056,750 A | 10/1991 | Ellithrope | |
| 5,234,279 A | 8/1993 | Poutanen | |
| 5,354,411 A | 10/1994 | Lines | |
| 5,573,354 A | 11/1996 | Koch | |
| 5,618,371 A | 4/1997 | Sing | |
| 5,678,382 A | 10/1997 | Naito | |
| 5,735,087 A | 4/1998 | Olden | |
| 5,833,421 A | 11/1998 | Lees et al. | |
| 5,848,866 A | 12/1998 | Black, Jr. | |
| 5,853,909 A | 12/1998 | Reiser | |
| 5,896,716 A | 4/1999 | Jalla | |
| 5,966,892 A | 10/1999 | Platt | |
| 6,203,232 B1 | 3/2001 | Ward | |
| 6,299,378 B1 * | 10/2001 | Griffith | F16B 15/0046 |
| | | | 403/293 |
| 6,347,489 B1 | 2/2002 | Marshall | |
| 6,409,156 B2 | 6/2002 | Dent | |
| 6,561,739 B1 | 5/2003 | Garala | |
| 6,964,139 B2 | 11/2005 | Meyer et al. | |
| 7,275,351 B2 | 10/2007 | Knepp | |
| 7,343,713 B2 | 3/2008 | Knepp et al. | |
| 7,574,841 B2 | 8/2009 | Knepp et al. | |
| 7,748,190 B1 * | 7/2010 | Loper | F16B 15/0046 |
| | | | 411/466 |
| 7,980,034 B2 | 7/2011 | Fehr et al. | |
| 8,056,299 B2 | 11/2011 | Liskey | |
| 8,347,571 B2 | 1/2013 | Fehr et al. | |
| 8,347,584 B2 | 1/2013 | Fehr et al. | |
| 8,407,967 B2 | 4/2013 | Brindle | |
| 8,453,416 B2 | 6/2013 | Brindle | |
| 8,584,413 B1 * | 11/2013 | Keller, Sr. | E02D 27/32 |
| | | | 52/297 |
| 8,826,629 B1 | 9/2014 | Brindle | |
| 9,038,353 B2 | 5/2015 | Huncovsky | |
| 9,070,390 B2 | 6/2015 | Green et al. | |
| 9,217,248 B2 | 12/2015 | Knepp et al. | |
| 9,234,350 B1 | 1/2016 | Gilbert et al. | |
| 9,528,265 B1 | 12/2016 | Gilbert et al. | |
| 9,540,814 B2 | 1/2017 | Meyer et al. | |
| 2006/0037256 A1* | 2/2006 | Pryor | E04B 2/707 |
| | | | 52/167.1 |
| 2011/0250443 A1 | 10/2011 | Schall | |
| 2013/0239512 A1 | 9/2013 | Yang | |
| 2013/0326968 A1 | 12/2013 | Meyer et al. | |
| 2014/0373471 A1 | 12/2014 | Knepp | |
| 2017/0037892 A1* | 2/2017 | Higgins | F16B 15/0046 |

OTHER PUBLICATIONS

Flouro et al., "Moment Resisting Wood Post-to-Concrete Pier Connection", Biological Systems Engineering Department University of Wisconsin-Madison, 2006.

Columns Brochure, Walters Buildings, Nov. 2008.

* cited by examiner

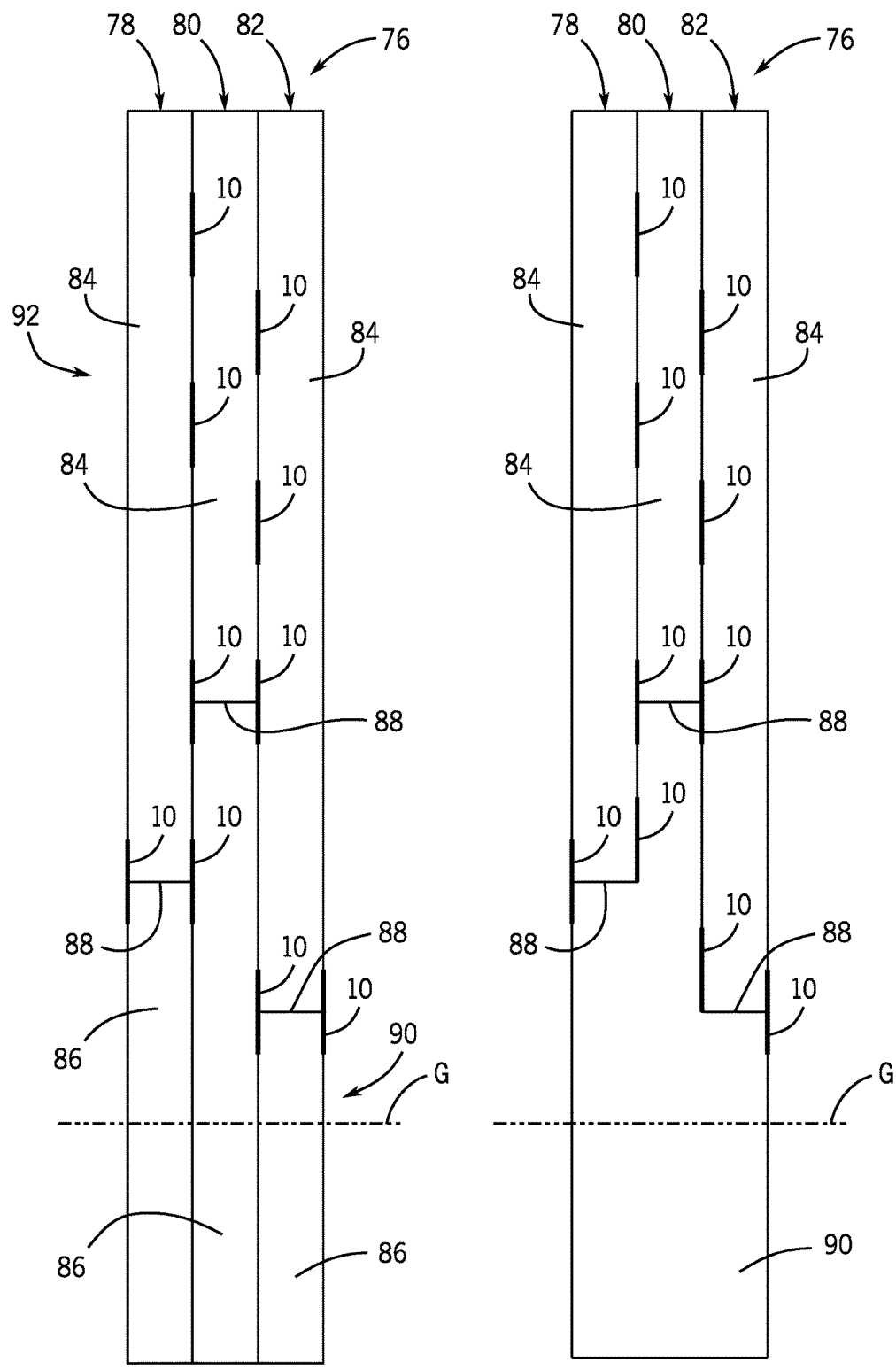

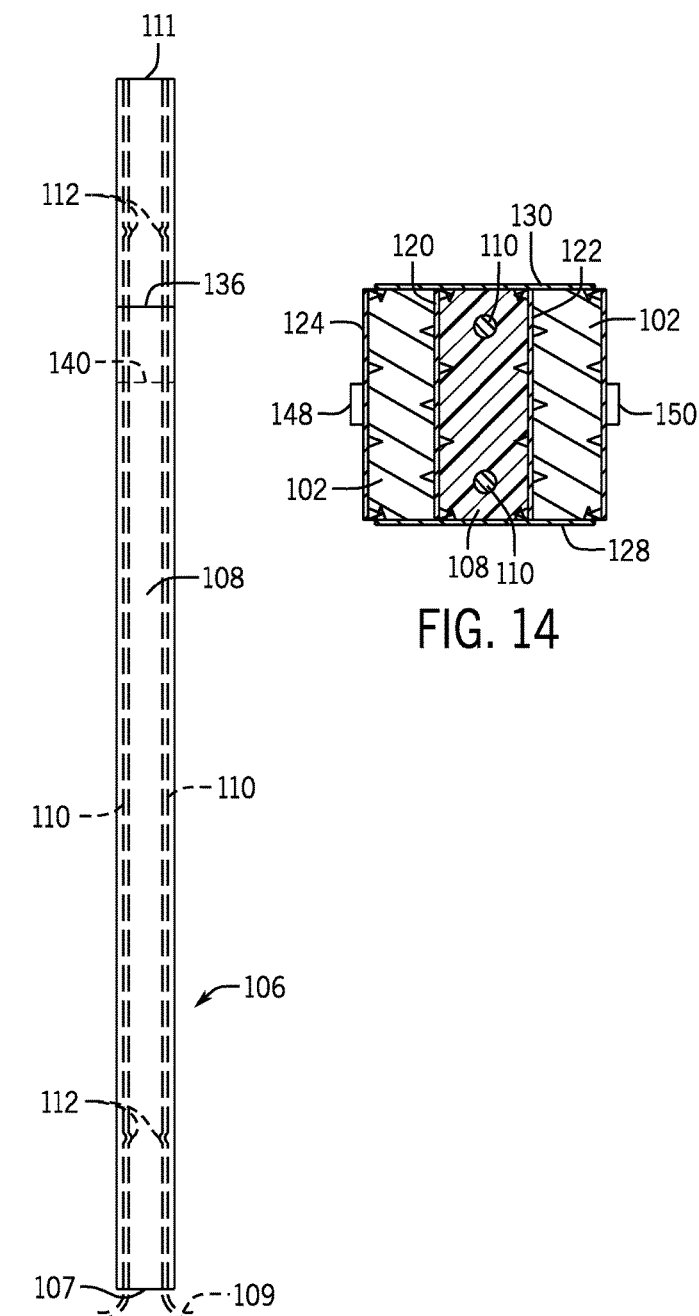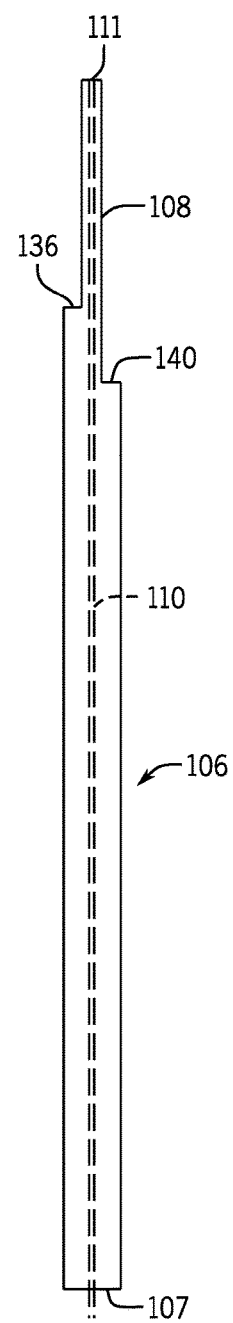
FIG. 13
FIG. 14
FIG. 15

FRICTION FIT COMPOSITE COLUMN

CROSS-REFERENCE TO RELATED APPLICATION

The present application is a continuation of U.S. application Ser. No. 15/606,519 filed May 26, 2017, which application published on Oct. 26, 2017 as U.S. 2017/0306626, which application is a continuation of U.S. application Ser. No. 15/363,576 filed Nov. 29, 2016, which application published on Mar. 16, 2017 as U.S. 2017/0073972, and granted as U.S. Pat. No. 9,719,527 on Aug. 1, 2015, which application relates to and claims priority to U.S. Provisional Patent Application Ser. No. 62/405,623 filed on Oct. 7, 2016 and is a Continuation-in-Part of and claims priority to U.S. patent application Ser. No. 14/962,022 filed Dec. 8, 2015, now U.S. Pat. No. 9,528,265, grant date Dec. 27, 2016, which is a Continuation-in-Part of U.S. patent application Ser. No. 14/562,054 filed Dec. 5, 2014, now U.S. Pat. No. 9,234,350, grant date Jan. 12, 2016, which claims priority to U.S. Provisional Patent Application Ser. No. 61/912,681 filed Dec. 6, 2013, all of which are incorporated herein in their entireties.

FIELD OF THE DISCLOSURE

The present disclosure relates to a composite assembly for use in the construction industry. More specifically, the present disclosure relates to a friction fit composite column base for use in a structural assembly.

BACKGROUND

In the construction of buildings, outdoor structures or the like, it is often desirable to utilize a beam or column which includes a plurality of boards, rather than an integral post made from a single piece of building material such as wood. Many embodiments of composite assemblies use one or more connectors to connect the plurality of component boards into the composite assembly. The composite assembly made from a plurality of boards can serve as a less expensive substitute for integral posts made from a single piece of wood, which can be quite expensive. It is not uncommon for building materials to increase exponentially in cost for every increase in length or width of the building material piece.

It is known to provide a composite assembly comprised of a series of elongated layers secured together lengthwise thereof with each layer including an upper elongated support member joined to a lower elongated ground-engaging member at a joint by a connector device. In such a composite assembly, the upper elongated member is normally constructed of a non-treated wood, and the lower elongated member is typically fabricated of a treated wood. Such treated wood is infused with a chemical, such as chromated copper arsenate (CCA), to prevent the natural process of decay of the ground-engaging wood. While such a composite assembly is acceptable in commercial building application, the Environmental Protection Agency (EPA) has banned the use of wood as used in the ground-engaging lower portion of the composite assembly for most residential use.

BRIEF DISCLOSURE

Therefore, Applicant has developed a composite assembly which is compliant with EPA regulations for use in residential application, and which is disclosed herein. The composite assembly is adapted for use as a support column in a building structure, and is comprised of a series of layers joined together lengthwise thereof. At least two of the elongated layers each include an upper elongated portion and a lower elongated portion secured together in an end-to-end relationship at a joint therebetween by a connector arrangement. The upper elongated portion is constructed of a first material comprised of wood, and the lower elongated portion is constructed of a second material comprised of a material other than wood, such as plastic.

In one exemplary embodiment, the lower elongated portions are embodied in separate, integrally formed segments. In another exemplary embodiment, the lower elongated portions are jointly formed together in a unit.

In another exemplary embodiment, the composite assembly is adapted for use as a support column in a building structure, and is comprised of a series of layers joined together lengthwise thereof. At least two of the elongated layers each include an upper elongated portion secured to a unitary lower assembly in an end-to-end relationship at a joint therebetween by a connector arrangement. The upper elongated portion is constructed of a first material comprised of wood, and the unitary lower assembly is constructed of a second material comprised of a material other than wood, such as plastic. Each joint between the upper elongated portion and the unitary lower assembly is staggered at different heights relative to one another.

In yet another embodiment, a composite assembly adapted for use as a vertical support column in a building structure includes at least two elongated layers joined together lengthwise thereof, including an upper elongated portion and a unitary lower assembly joined in an end-to-end relationship by a connector arrangement. The unitary lower assembly includes at least one reinforcing rod. The upper elongated portion is constructed of a first material comprised of wood, and the unitary lower assembly is constructed of a second material other than wood, such as plastic.

BRIEF DESCRIPTION OF THE DRAWINGS

FIG. 9 is a front view of one embodiment of a composite assembly in accordance with the present disclosure;

FIG. 10 is a front view of another embodiment of a composite assembly in accordance with the present disclosure.

FIG. 13 is a side view of a central elongated region of the composite assembly shown in FIGS. 11 and 12;

FIG. 14 is an enlarged sectional view taken on line 14-14 of FIG. 11;

FIG. 15 is a front view of a unitary lower assembly used in the composite assembly of FIG. 11;

DETAILED DESCRIPTION

Dual sided connectors and composite assemblies including dual sided connectors are disclosed herein. The dual sided connectors can be used to interconnect a member of building material such as wood or wood composite timbers or boards in order to produce beams, columns, headers, trusses, or any other composite assemblies for use in the construction of buildings or the like. Embodiments of the dual sided connector can include a base plate with a plurality of teeth extending outwardly from the base plate. The dual sided connector can be disposed between layers or plies of building material so that it bridges an inner portion of the building material. When this assembly is compressed together, the teeth engage the building material and are embedded in the building material. Thus, building material members are spliced together to form the composite assembly.

Composite assemblies formed using connector plates are economical replacements for the use of integral or one piece wooden beams or columns in building construction. The ability of a composite assembly to be formed of smaller, and therefore cheaper, building material stock allows for the creation of a composite assembly of similar dimensions and strength of an integral beam, at a fraction of the cost. Various patterns and orientations for the teeth of the connectors are known and typically include teeth that enter a wooden component member parallel to the wood grain or perpendicular to the wood grain. However, it has been determined that these tooth alignments are undesirable, and an improved tooth arrangement is needed. Connector teeth that enter the wood parallel to the wood grain promote splitting of the wood along the wood grain, while teeth that enter the wood perpendicular to the wood grain are often flattened upon insertion into the wood and therefore show reduced ability to be secured into the wood.

Figure 1:
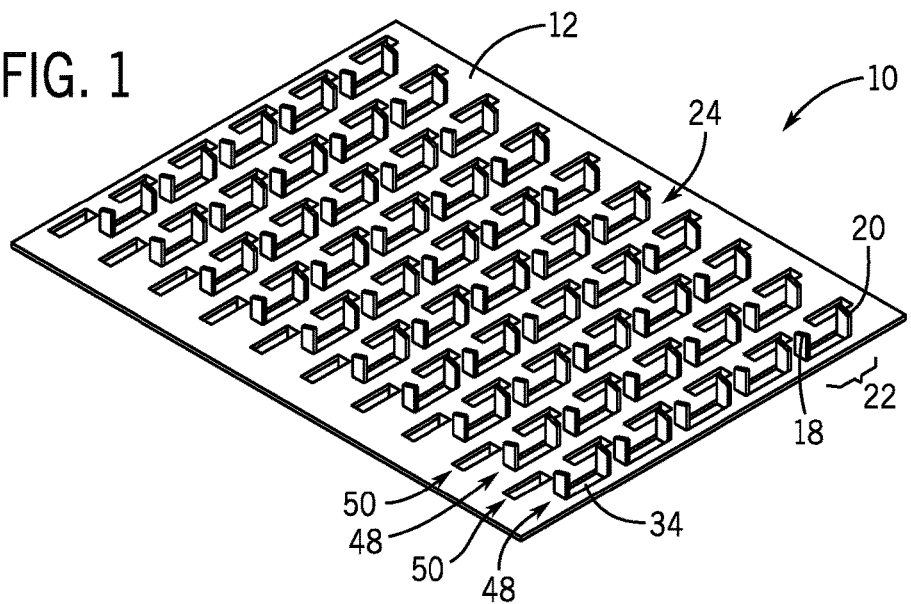
FIG. 1 is a perspective view of an embodiment of a dual sided connector used in a composite assembly.

FIG. 1 depicts an embodiment of a dual sided connector 10. The dual sided connector 10 comprises a base plate 12. The base plate 12 may be of a galvanized steel; however, the type of material for the base plate 12 should not herein be limited to galvanized steel, but may also include any other suitable material that would be recognized by one skilled in the art. A plurality of teeth including a first tooth 18 and a second tooth 20 extend outwardly from the base plate 12. The first tooth 18 and the second tooth 20 form a tooth pair 22.

Figure 3:
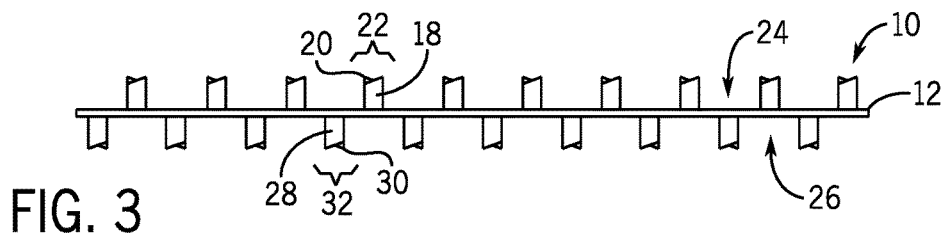
FIG. 3 is a side view of an embodiment of the dual sided connector.

Referring to FIG. 3, the base plate 12 further includes a first surface 24 and a second surface 26. The first tooth 18 and second tooth 20 form a tooth pair 22 that extends outwardly from the first surface 24 of the base plate 12. A third tooth 28 and a fourth tooth 30 form a tooth pair 32 that extends outwardly from the second surface 26 of the base plate 12. Thus, tooth pair 22 extends in an opposite direction from the base plate 12 than tooth pair 32 extends from the base plate 12.

Figure 2:
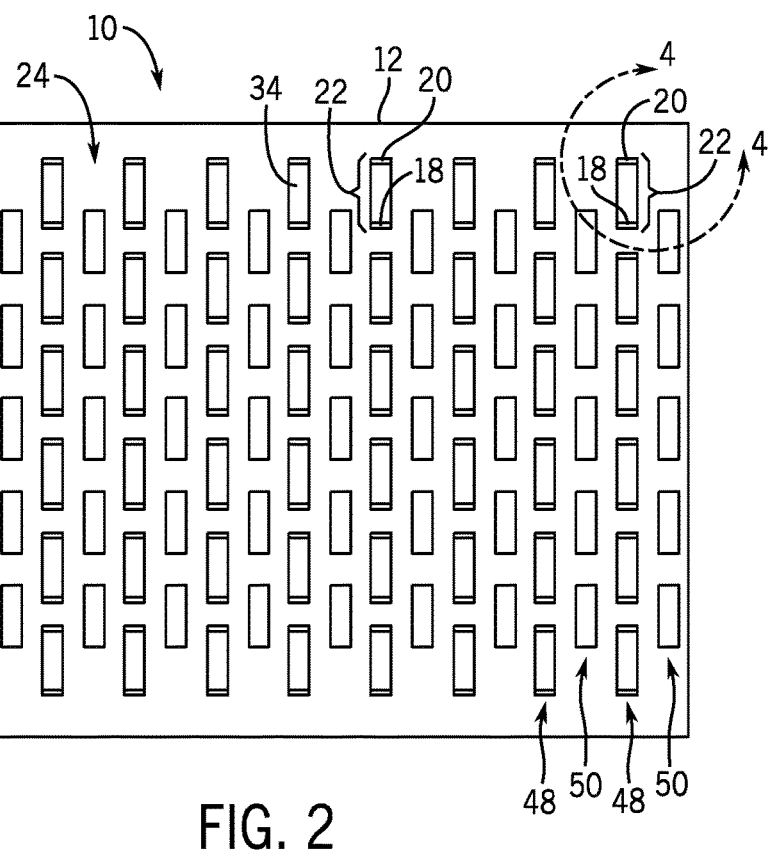
FIG. 2 is a top view of an embodiment of the dual sided connector.

In an embodiment, the outwardly extending teeth may be formed by die cutting the teeth from the material of base plate 12 through the use of a punching mechanism using a die to cut the teeth from the base plate 12. In these embodiments, the die may be formed to produce twisted teeth, as will be disclosed in greater detail herein, as the die passes through the base plate 12. The punching mechanism may be arranged such that a separate die or set of dies is used to punch the teeth extending in each direction from the base plate 12. These teeth may be punched simultaneously or separately. As a result of the die cutting, some embodiments may include an opening 34 formed in the base plate 12 (as depicted in FIGS. 1 and 2) where the material for each of the teeth was removed. Each tooth pair 22 is cut by a single die cut resulting in a single opening 34 between the first tooth 18 and the second tooth 20 of the tooth pair 22.

It is understood that while for the sake of simplicity, first surface 24, first tooth 18, second tooth 20, and tooth pair 22 are described in further detail herein, the description is similarly applicable to the second surface 26, third tooth 28, fourth tooth 30, and tooth pair 32, projecting from the opposite side of base plate 12.

Figure 5:
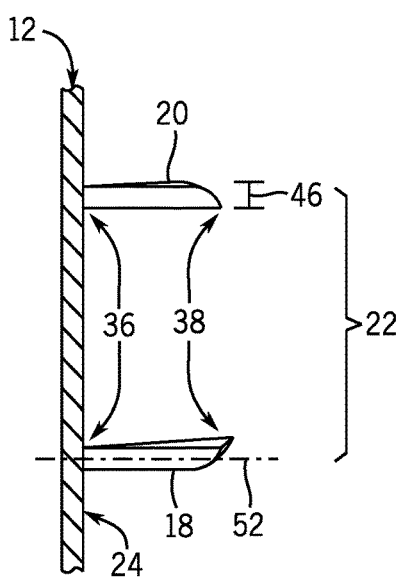
FIG. 5 is a side view of a tooth pair of the dual sided connector.
Figure 6:
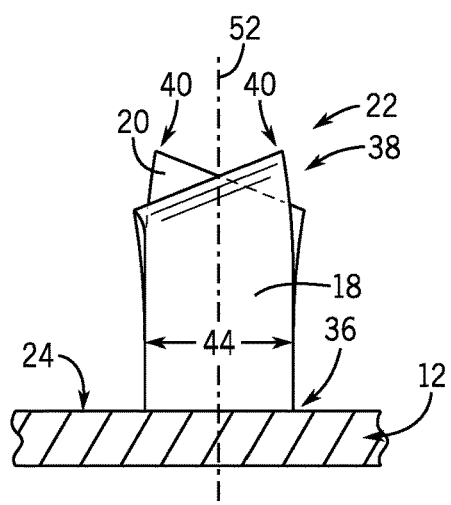
FIG. 6 is a side view of a tooth pair of the dual sided connector.

Referring to the embodiment of the dual sided connector 10 depicted in FIGS. 5 and 6, both the first tooth 18 and the second tooth 20 of tooth pair 22 project outwardly from the base plate 12 in the same direction from the first surface 24. The first tooth 18 and second tooth 20 extend generally parallel to each other and generally perpendicular to the base plate 12. The first tooth 18 and second tooth 20 are trapezoidal in shape with a base end 36 connected to the base plate 12 and an outwardly extending end 38 away from the first surface 24. The outwardly extending end 38 of the first tooth 18 terminates in a tip 40. The outwardly extending end 38 of the second tooth 20 terminates in a tip 42. The tip 40 and tip 42 may simply come to points, but also may be manufactured so as to be chiseled in profile. The tip 40 of the first tooth 18 matches in height, the tip 42 of the second tooth 20.

The tip 42 of the second tooth 20 is offset from the tip 40 of the first tooth 18, as seen in FIG. 6. Teeth 18 and 20 each have a vertical axis 52 as will be described in further detail herein. The tips 40 and 42 may be offset from each other at opposite sides of the vertical axis 52 of their respective tooth. Thus tip 40 is offset to one side of vertical axis 52 and tip 42 is offset to the other side of vertical axis 52. The offset of tips 40 and 42 of this embodiment provide particular advantages when the dual sided connector 10 is used to join two or more members of building material. One advantage is that the offset nature of tip 40 and tip 42 help to evenly balance each building material member on the connector 10 and promote even insertion of the teeth (18, 20) into the building material members. Additionally, the tips (40, 42) reduce the force necessary to penetrate the building material member and help to reduce any instances of splitting in the building material members as a result of the insertion of teeth into the building material members.

The offset tips 40 and 42 provide an additional advantage in manufacturing the dual sided connector 10. In this embodiment, a die used to cut the tooth pair 22 can cut both the first tooth 18 and the second tooth 20 at the same time as the offset tips (40, 42) of the first and second teeth (18, 20) interlace in the die pattern. Thus only a single die cut is needed to cut both the first tooth 18 and the second tooth 20 including the tips (40, 42) of the teeth. Therefore, in some embodiments, the dual sided connector 10 may have the additional benefit of providing the presently disclosed features with a simplified manufacturing process to make the dual sided connector 10.

Still referring to FIGS. 5 and 6, the first tooth 18 and the second tooth 20 are oriented in the tooth pair 22 such that each tooth has an elongated profile 44 and a narrow profile 46. In the tooth pair 22, the elongated profiles 44 of the teeth are parallel and face each other. The elongated profiles 44 of the teeth promote gripping of the building material upon insertion and the narrow profiles 46 of the tooth promote insertion of the tooth into the building material and reduced splitting of the building material.

Referring to FIGS. 1 and 2, the dual sided connector 10 is arranged with a plurality of tooth pairs 22 oriented in a series of rows 48. The rows 48 are aligned on the base plate 12 perpendicular to the elongated profile 44 (See FIG. 6) of the teeth of the tooth pair 22. The plurality of tooth pairs 22 in each of the rows 48 all extend outwardly from the first surface 24 of the base plate 12 in the same direction. The dual sided connector plate 10 is further arranged with a plurality of rows 50 comprising tooth pairs 32 extending outwardly from the second surface 26 of the base plate 12 and in the opposite direction from tooth pairs 22. Rows 50 are aligned on the base plate 12 in an alternating fashion with rows 48 alternatingly extending from the base plate 12 in the opposite direction. The alternating rows 48 and 50 of outwardly extending tooth pairs 22 and tooth pairs 32 in opposite directions promote an even distribution of the tooth pairs (22, 32) extending from the first surface 24 and the second surface 26 of the base plate 12. Therefore, the teeth in rows 48 extend from the base plate 12 in one direction and the teeth in rows 50 extend from the base plate 12 in the opposite direction. Some embodiments of the dual sided connector 10 may feature rows 48 and 50 in which the tooth pairs (22, 32) in alternating rows (48,50) are offset, as depicted in FIGS. 1 and 2. The offset of opposing tooth pairs further improve the uniformity of the distribution of the teeth in the dual sided connector 10 and may promote additional support and structural strength within the base plate 12.

Figure 4:
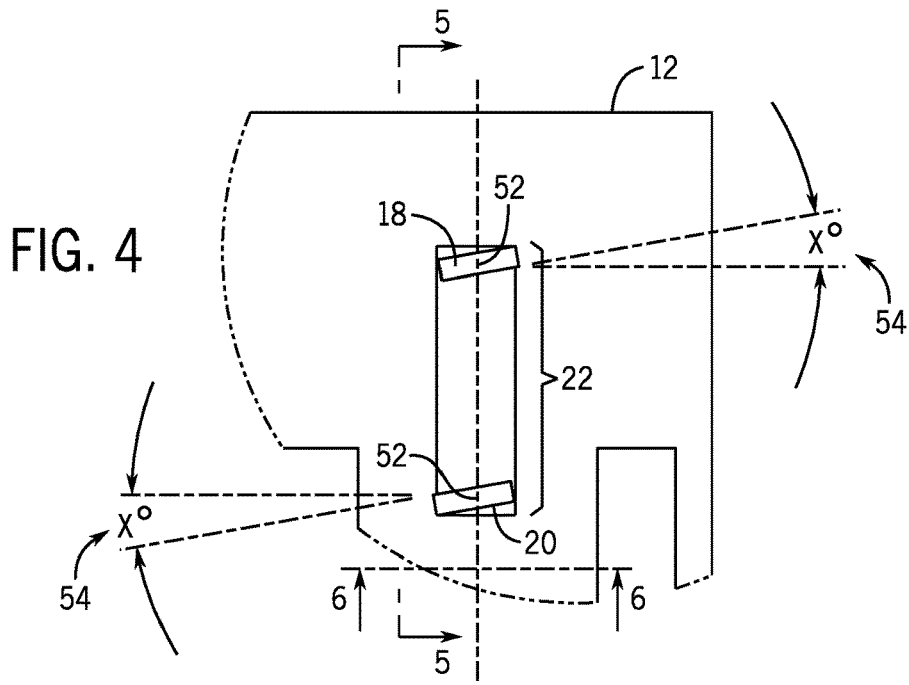
FIG. 4 is a close up view of an embodiment of a tooth pair of the dual sided connector.

Now referring to FIGS. 4-6, as mentioned previously, the first tooth 18 and the second tooth 20 of the tooth pair 22 each comprise a vertical axis 52 perpendicular to the base plate 12. The first tooth 18 and the second tooth 20 are twisted about this axis. Similar or matching twists may be placed in both the first tooth 18 and the second tooth 20 of the tooth pair 22. The twist angle 54 is generally between an angle of zero and 45 degrees from normal. The twist angle 54 may be any angle within this range. In one embodiment, the angle is 20 degrees or less. In another embodiment, the angle is between 10 and 15 degrees. In another embodiment, the angle may be between zero and 10 degrees. In a further embodiment, the angle may be three degrees. The twists in the teeth (18, 20) may be clockwise or counter clockwise, and may all be in the same direction for all of the teeth. In alternative embodiments, the twists in the teeth (18, 20) may be different for different individual teeth, or may be coordinated between tooth pairs 22, rows 48, 50 of tooth pairs, or on each side of the dual sided connector 10. It should be understood that in embodiments wherein the tooth pair 22 is cut by a die, the die may be modified in order to produce the desired angle of the twist, or the orientation of the twist for the teeth in the tooth pair 22.

The feature of the twisted teeth of the dual sided connector 10 provide advantages in use and implementation of the dual sided connector 10 over previous connector designs and implementations as will be described in further detail herein.

Figure 7:
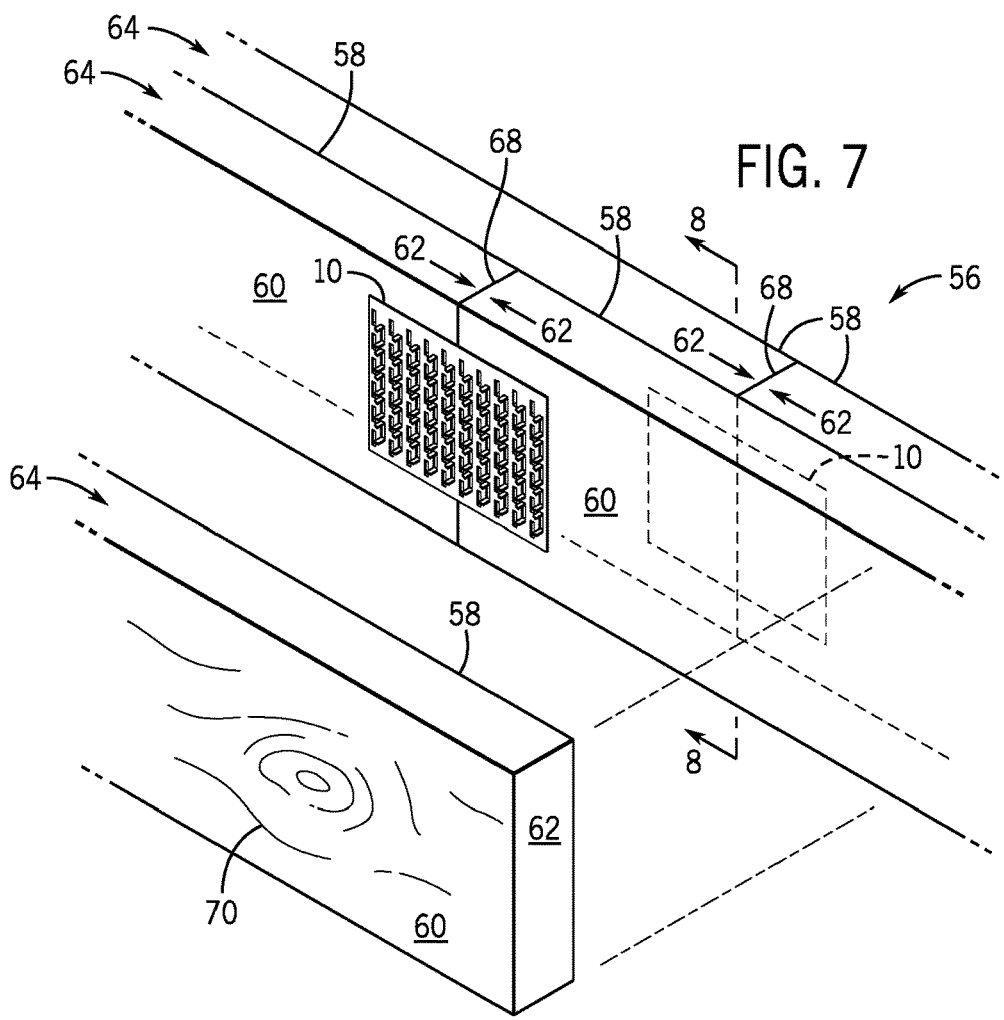
FIG. 7 depicts a composite assembly comprising a dual sided connector.
Figure 8:
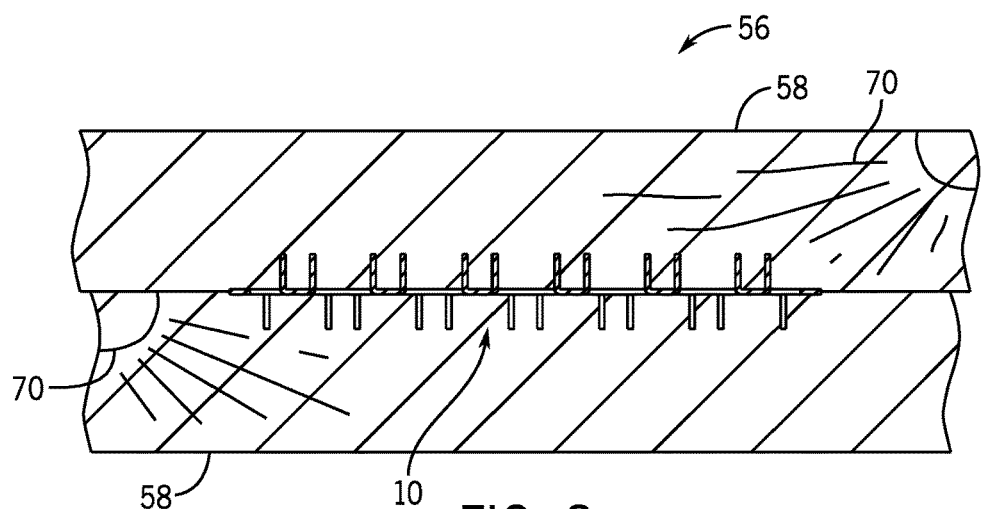
FIG. 8 is a cross sectional view of a composite assembly comprising a dual sided connector.

Referring to FIGS. 7 and 8, the dual sided connector 10 may be used to construct a composite assembly 56 such as a beam, post, column, truss, or the like. The composite assembly 56 may be formed from a plurality of elongated wood boards 58. In the embodiment disclosed in further detail herein the composite assembly 56 comprises a plurality of wood boards 58; however, it is understood that other building material members comprising not only wood and wood composite boards, but engineered boards, synthetic composite materials, or any other suitable building materials as recognized by one skilled in the art may be used. The wood boards 58 may be of varying lengths, but each has face 60 on opposite sides of the board 58 and each board 58 terminates in an end 62.

Wood boards 58 are disposed in an end-to-end relationship wherein the end 62 of one board 58 abuts an end 62 of a second board 58. The ends 62 of the wood boards 58 meet to form a joint 68. The one or more wood boards 58 aligned in the end-to-end relationship form a first layer 64 of the composite assembly 56. The composite assembly 56 may comprise a plurality of layers, depicted here as a second layer 72 and a third layer 74. Each of the layers (64, 72, 74) are made up of at least one wood board 58 and it should be understood that the composite assembly 56 may be made from any number of layers, from two or more.

The first layer 64 and the second layer 72 are aligned in a face-to-face relationship wherein the faces 60 of the wood boards 58 in the first layer 64 are arranged to contact the faces 60 of one or more wood boards 58 of the second layer 72. At least one of the layers, such as first layer 64, includes a plurality of wood boards 58. The joint 68 between the wood boards 58 of the layer 64 is secured using one side of the dual sided connector 10 as disclosed herein to connect the wood board 58 to the other wood board 58 across the joint 68.

In implementation, the composite assembly 56 is formed by aligning a dual sided connector 10 across the joint 68 of two boards 58 in the first layer 64. In one embodiment, the dual sided connector 10 is aligned so that half of the tooth pairs 32 on the second surface 26 of the dual sided connector 10 are arranged over one of the wood boards 58 of the first layer 64 and the other half of the tooth pairs 32 on the second surface 26 of the dual sided connector 10 are arranged over the other wood board 58 of the first layer 64. Thus, the dual sided connector 10 is evenly arranged over the joint 68.

The second layer 72 includes at least one wood board 58 and is arranged over the top of the dual sided connector 10.

A single wood board 58 of the second layer 72 is placed in contact with the teeth extending from the first surface 24 of the dual sided connector 10. The composite assembly 56 is arranged in this manner so that the dual sided connector 10 does not cover a joint 68 between two boards 58 in both the first layer 64 and the second layer 72. The staggering of the joints 68 across the layers (64, 72, 74) promotes strength in the fully constructed composite assembly 56. Each staggered joint 68 of one layer is matched with a face of a single wood board 58 of the next layer. Therefore, each dual sided connector 10 of the composite assembly 56 attaches three boards together.

The wood boards 58 are constructed such that a wood grain 70 runs generally along the length of each of the boards 58. In a further aspect of the disclosure, the dual sided connector 10 is aligned over the joint 68 between the boards 58 such that the dual sided connector 10 is square with each of the boards 58 and evenly disposed over the boards 58 of the joint 68. Furthermore, the dual sided connector 10 is arranged with the elongated profile 44 of each of the teeth of the dual sided connector aligned generally parallel with the wood grain 70 of the boards 58. A similar alignment exists between the dual sided connector 10 and the wood board 58 of the second layer 72, aligned in face-to-face relationship with the first layer 64. Therefore, the elongated profile 44 of the teeth of the dual sided connector 10 is also aligned generally parallel with the wood grain 70 of the board 58 of the second layer 72.

While it is understood that the teeth of the dual sided connector 10 are twisted as disclosed above and the grain of the wood boards 58 is generally variable, and therefore the twisted teeth will generally not be perfectly parallel with the grain 70 of the wood board 58, because the twist angle 54 of each of the teeth is less than 45 degrees and the wood grain 70 runs generally parallel to the length of each of the boards 58, if the dual sided connector 10 is square with the board 58, there will be a preferred orientation in which the elongated profile 44 of the teeth of the dual sided connector 10 are more generally parallel with the wood grain 70 and an alternative, less favored orientation in which the elongated profile 44 of the teeth of the dual sided connector 10 are more generally perpendicular to the wood grain 70 of the boards 58. The general alignment of the elongated profile 44 of each of the teeth of the dual sided connector with the wood grain 70 of the boards 58 improves the resulting penetration of the teeth into the wood boards 58 as will be described in further detail herein.

It is understood that in alternative embodiments, the dual sided connector 10 may be aligned such that the elongated profile 44 at the base of the teeth is generally parallel with the wood grain 70. Alternatively still, the elongated profile 44 of each of the teeth at the tip (40, 42) may be aligned generally parallel with the wood grain 70.

Once the wood boards 58 and the dual sided connector 10 have been arranged as disclosed, a compressive force is applied to the wood boards 58 of the composite assembly 56. This presses the dual sided connector 10 into the wood boards 58 of both of the layers. The alignment of the teeth of the dual sided connector 10 in general alignment with the wood grain 70 of the wood boards 58 as well as the tips (40, 42) of the teeth of the dual sided connector 10 and the offset orientation of the tips (40, 42) of the teeth (18, 20) in each tooth pair 22 of the dual sided connector 10 promote the penetration of the teeth into the wood boards 58. This allows for the dual sided connector 10 to embed into the wood boards upon compression of the composite assembly 56 such that the dual sided connector 10 is not visible in the completed composite assembly 56. Rather, the teeth and the base plate 12 of the dual sided connector 10 are embedded between the layers (64, 72, 74) of the wood boards 58. The twisting of each of the teeth of the dual sided connector 10 helps to limit any splitting of the wood boards 58 along the grain of the wood 70 as the teeth enter the wood offset from parallel with the wood grain 70. Yet, the twist angle is acute enough such that the teeth do not enter the wood substantially perpendicular to the wood grain 70 and therefore desirable penetration is achieved into the wood boards 58. The dual sided connector 10 exhibits an improved gripping ability as the twisted teeth are more resistant to loosening over time than straight teeth Embodiments of the composite assembly 56 may include multiple layers to the composite assembly 56, which are represented by layer 74, in order to create the desired width of the composite assembly 56. In these embodiments, one or more additional dual sided connectors 10 may be used to connect the layers of the composite assembly 56. In some embodiments, the outside layer (i.e. second layer 72) on either side of the composite assembly 56 comprises a single integral board running the length of the composite assembly 56. One or more interior layers (i.e. first layer 64 or third layer 74) may comprise a plurality of boards 58 in each layer extending to the desired total length of the composite assembly 56. This presents the advantage of reducing the cost of the composite assembly 56 by using shorter, and therefore less expensive boards 58 on the interior of the composite assembly 56, while the aesthetics of the composite assembly 56 are promoted through the continuous outside facing boards. This eliminates visible joints 68 in the faces of the composite assembly 56 and promotes the illusion that the composite assembly 56 is a single piece of material.

The composite assembly 56 therefore presents the advantages of having an improved aesthetic appearance as the improved penetration of the dual sided connectors 10 hide the dual sided connectors 10 in the interior of the composite assembly 56 by embedding the dual sided connectors 10 into the boards 58 of the composite assembly 56. Also, the orientation of the twisted teeth of the dual sided connector reduces the likelihood of splitting the boards 58 of the composite assembly 56 and thus more consistently produces an aesthetically pleasing composite assembly 56 that is free of splits, cracks, or other defects due to the connector plates. The composite assembly 56 further exhibits the advantage of being stronger than previous composite assemblies as the improved penetration of the teeth and the twisted orientation of the teeth provide a tighter hold between the dual sided connector 10 and the boards 58 of the composite assembly 56. Additionally, the reduced splitting experienced with the disclosed dual sided connector further improves the overall strength and integrity of the composite assembly 56 as splits or other flaws may create weak spots within the composite assembly 56 that are aggravated in load bearing use.

It should be understood from the disclosure herein that many modifications as would be recognized by one skilled in the art may be made to the embodiments disclosed herein and will be considered to be within the scope of this disclosure. In this respect, the dual sided connector as disclosed herein may be constructed to any dimension as one skilled in the art may deem suitable for the desired implementation and use in constructing a composite assembly. In embodiments wherein the dual sided connector is to be embedded within the composite assembly and thus not visible in the finished composite assembly, it is understood that the dimensions of the dual sided connector would include those that are smaller than the dimensions of the wood boards of which the composite assembly is comprised. It is further understood that the composite assembly may include a plurality of layers of wood boards connected by a plurality of dual sided connectors in order to form a composite assembly having greater dimensions than those of the single wooden boards.

The present disclosure contemplates a composite assembly 76 such as may be used as a vertical support column in a residential building structure.

Referring to FIGS. 9 and 10, the composite assembly 76 is comprised of a series or plurality of opposing elongated layers 78, 80, 82 joined together lengthwise thereof. Each of the layers 78, 80, 82 includes an upper elongated portion in the form of an elongated member 84, and a lower elongated portion in the form of an elongated member 86. The upper and lower elongated portions 84, 86 are secured together in an end-to-end relationship at joints 88 by connector arrangements or connectors 10 as previously described above. Top ends of the upper elongated portions 84 are typically used for supporting a superstructure of a building structure. Bottom ends of the lower elongated portions 86 are embedded securely beneath a ground surface G. Each of the elongated layers 78, 80, 82 are joined together along opposed interior faces by the connectors 10 at the joints 88 as well as at other locations spaced apart from and above the joints 88.

In accordance with the present disclosure, the upper elongated portions 84 are constructed of a first material comprised of wood. In contrast, the lower elongated portions 86 are constructed of a second material comprised of a material other than wood. One example of a non-wood material to be used is plastic; however, it should be understood that the second material is not limited exclusively to plastic, and that use of other non-wood materials in the lower elongated portions 86 is contemplated as desired.

In the embodiments shown in FIG. 9, the upper elongated portions 84 form an upper assembly 92 constructed of single elongated member of wood, exemplarily untreated wood. A lower assembly 90 is constructed of the lower elongated portions 86 which are single members of a non-wood material. It should be understood that the elongated portions 84, 86 may alternatively be constructed of multiple elongated members joined together suitably by connectors 10. For example, upper elongated portions 84 may include more than one elongated member while lower elongated portions 86 may remain fabricated of single elongated members.

As described above, in the embodiment of FIG. 9, the lower assembly 90 is formed of elongated portions 86 embodied in individual elongated members formed separately and individually from one another. In the embodiment of FIG. 10, the lower assembly 90 is formed together as a single unitary structure of non-wood material.

In the representative composite assembly 76 of FIG. 9, the combined length of the elongated layers 78, 80, 82 is substantially equal. For example, each layer 78, 80, 82 has a total length of twenty feet with a width of six inches and a depth of two inches. Layer 78 has an upper elongated portion 84 which is twelve feet in length, and a lower elongated portion 86 which is eight feet in length. Layer 80 has an upper elongated portion 84 and a lower elongated portion 86 which are each ten feet in length. Layer 82 has an upper elongated portion 84 which is fourteen feet in length, and a lower elongated portion 86 which is six feet in length. In this example, the joints 88 secured by the connectors 10 are staggered which promotes strength in the fully constructed composite assembly 76. Additional configurations and dimensions of the composite assembly 76 are envisioned by the disclosure. For example, one or more of the layers 78, 80, 82 may be elongated in a single elongated member constructed of plastic or another non-wood material throughout its length. At least two of the elongated layers 78, 80, 82 have upper elongated portions 84 comprised of wood, and lower elongated portions 86 comprised of a non-wood material.

FIGS. 11-15 illustrate a further embodiment of a composite assembly 94 such as may be used as a vertical support column in a building structure. The building structure may be a residential, commercial, or industrial building structure. The composite assembly 94 is comprised of a series of opposing elongated layers 96, 98, 100 joined together lengthwise thereof. Each of the layers 96, 98, 100 includes an upper elongated portion in the form of an elongated member 102 which is typically constructed of a first material comprised of wood, such as untreated wood. The upper elongated portions 102 together collectively form an upper assembly 104. Top ends of the upper elongated portions 102 are typically used for supporting a superstructure of a building.

The composite assembly 94 also includes a unitary lower assembly 106 having a flat lower end 107 embedded securely beneath the ground surface G. The lower assembly 106 is constructed of a second material which is a non-wood material such as plastic, although other non-wood materials besides plastic may be used. The lower assembly 106 has a central region 108 which is provided with reinforcing structure in the form of a pair of spaced apart reinforcing rods 110 as best seen in FIGS. 13 and 14. The rods 110 are typically embodied as rebar constructed of one-half inch diameter steel which extend longitudinally through the central region 108 of the lower assembly 106 from a flat upper end 111 thereof to and beneath the flat lower end 107 thereof for embedding in the ground. Each of the rods 110 is preferably formed with bends 112 extending inwardly a similar distance, exemplarily one foot, from the upper and lower ends 111, 107, respectively, of the lower assembly 106 to facilitate the securement of the rods 110 within the lower assembly 106 such as during formation of a plastic or other non-wood lower assembly 106. In an exemplary embodiment wherein the lower assembly 106 is a plastic composite material, the lower assembly 106 may be cast or molded around the rods 110. In such embodiments, the bends 112 may function to keep the rods 110 from separating from the lower assembly 106 during use.

Figure 11:
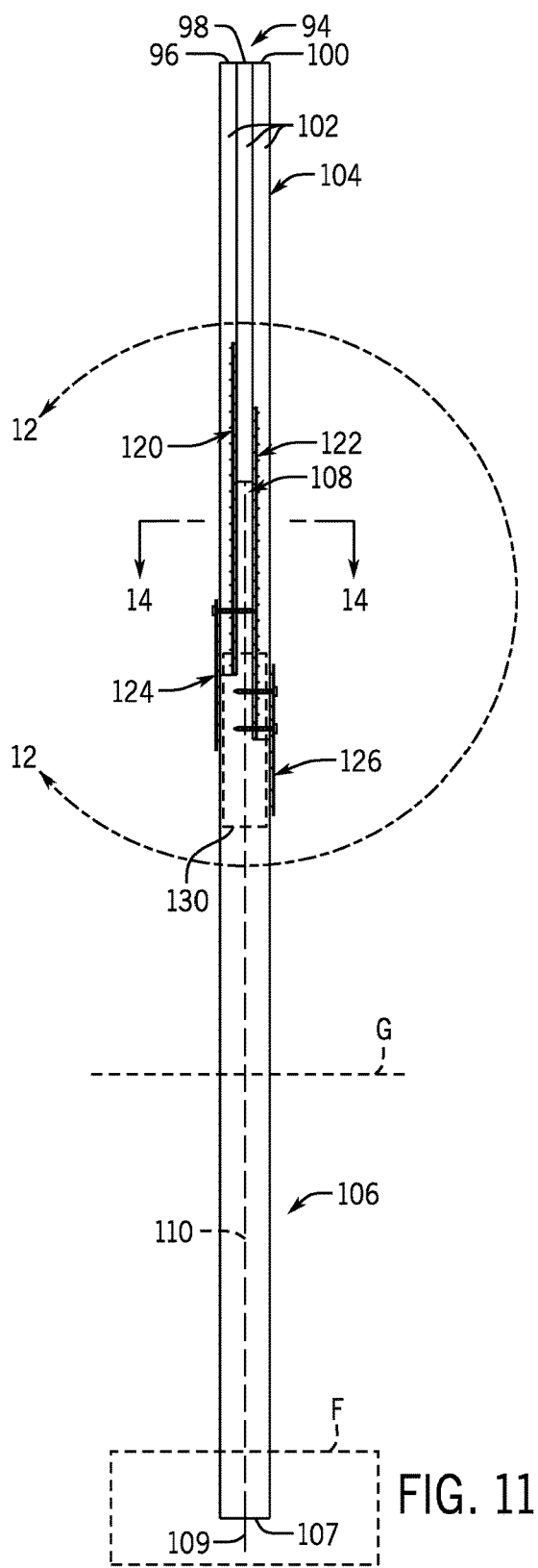
FIG. 11 is a broken into front view of yet another embodiment of a composite assembly in accordance with the present disclosure.

In an exemplary embodiment, the reinforcing rods 110 further extend out from the lower end 107 in projections 109. The projections 109 may exemplarily bend or angle away from one another and the generally parallel orientation of the reinforced rods 110 when extending through the lower assembly 106. In an embodiment, the projections 109 extend in a generally perpendicular direction from the rest of the reinforcing rod 110 and extend in such direction beyond a width of the lower assembly 106. As depicted in FIG. 11, the lower assembly 106 may be secured within a footing F beneath the ground surface G. In an example, the footing F is a poured concrete footing. The projections 109 extend into the footing F and further facilitate to secure the lower end 107 of the lower assembly 106 in position beneath the ground G.

At least two of the elongated layers 96, 98, 100 have upper elongated portions 102 comprised of wood, and the lower assembly 106 comprised of a non-wood material, such as a solid plastic core.

The upper elongated portions 102 and various height portions of the lower assembly 106 are joined together in an end-to-end relationship at joints 114, 116, 118 by connector arrangements formed by respective pairs of connector plates 120, 122, splice plates 124, 126 and deflection plates 128, 130. The joints 114, 116, 118 are staggered in height relative to one another as in the composite assembly 76 of FIGS. 9 and 10 to promote strength in the composite assembly 94. The joint 114 is formed between a flat lower end 132 of the upper elongated portion 102 of layer 98 and the flat upper end 111 of the central region 108 of the lower assembly 106. The joint 116 is formed between a flat lower end 134 of the upper elongated portion 102 of layer 96 and an inwardly extending ledge 136 formed on the lower assembly 106. The joint 118 is formed between a flat lower end 138 of the upper elongated portion 102 of the layer 100 and an inwardly extending ledge 140 of the lower assembly 106.

Figure 12:
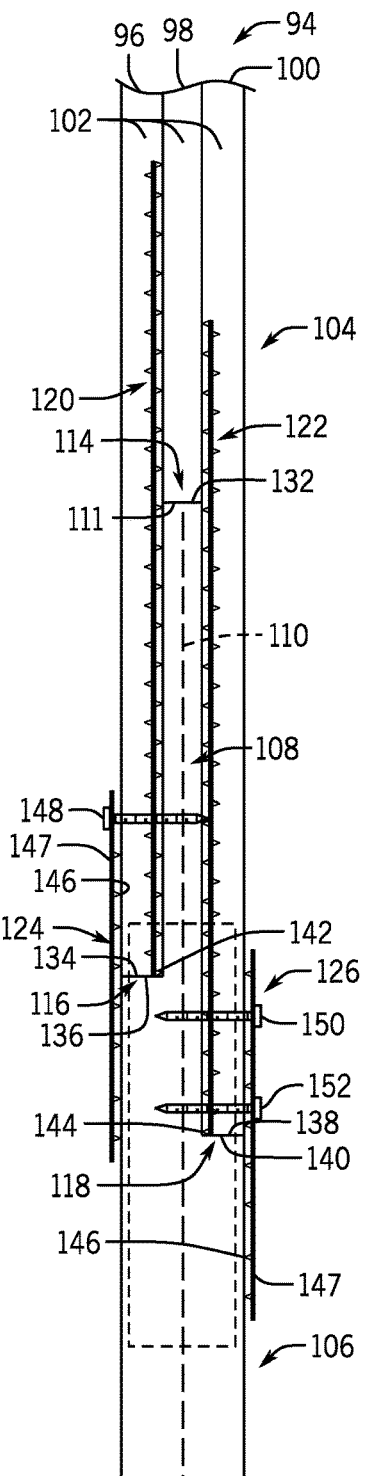
FIG. 12 is an enlarged detail view taken on line 12-12 of FIG. 11.

The plates 120, 122 define a first plate structure, take the form of dual-sided connectors 10 as described above and are used to join the elongated layers 96, 98, 100 along opposed interior faces thereof. In the examples shown, each of the plates 120, 122 have equal lengths with the plates 120, 122 lying parallel to each other and with their upper and lower ends in staggered relationship relative to one another. The plate 120 and plate 122 extend the lengths of respective sides of the central region 108, the joint 114 continue along the elongated layer 98. Elongated layer 96 is secured to the plate 120. Elongated layer 100 is secured to the plate 122. As best depicted in FIG. 12, the plate 120 is positioned across the joint 114 and has a lower end 142 which extends to and terminates at the joint 116. It is to be recognized that in alternative embodiments, the plate 120 terminates shortly before the joint 116. The plate 122 is positioned across the joint 114 and has a lower end 144 which extends to and terminates at the joint 118. It is to be recognized that in alternative embodiments, the plate 122 terminates shortly before the joint 118.

The splice plates 124, 126 define a second plate structure and are preferably configured with single-sided connectors formed with teeth 146 only on an inwardly facing surface of a base plate 147. The plates 124, 126 are of equal length, lie parallel to one another and have upper and lower ends which are in staggered relationship relative to one another. The plate 124 is centered lengthwise across the joint 116 along exterior side faces of the layer 96 and the lower assembly 106. A screw fastener 148 is passed through an upper end of the plate 124, the layer 96 and the plate 120, and is secured in the central region 108 of the lower assembly 106 to anchor the plate 124 on the composite assembly 94 such that the teeth 146 penetrate the exterior side faces of the layer 96 and the lower assembly 106 above and below the joint 116. This further serves to secure the flat lower end 138 to the lower assembly 106, and particularly to the central region 108. The plate 126 is centered lengthwise across the joint 118 along exterior side faces of the layer 100 and the lower assembly 106. A screw fastener 150 is passed through the plate 126, the layer 100 and the plate 122, and is secured in the central region 108 of the lower assembly 106 beneath the joint 116. Another screw fastener 152 is passed beneath screw fastener 150 through the plate 126, the layer 100 and the plate 122, and is secured in the central region 108 of the lower assembly 106. The screw fasteners 150, 152 fix the plate 126 on the composite assembly 94 such that the teeth 146 penetrate the exterior side surfaces of the layer 100 and the lower assembly 106 above and below joint 118. This further serves to secure the lower end 134 of the upper elongated portion 102 to the lower assembly 106, and particularly to the central region.

The deflection plates 128, 130 as best seen in FIG. 14 define a third plate structure. The deflection plates 128, 130 are similar to single-sided connector plates 124, 126 and are formed with teeth similar to teeth 146 on only an inwardly facing surface of the plates 128, 130. The plates 128, 130 are exemplarily of equal length and lie parallel to one another. Embodiments of the deflection plates 128, 120 have respective upper and lower ends as well as side edges which are aligned with one another. The plates 128, 130 are both centered lengthwise across the joint 118, and are suitably fixed such as by applying a suitable force causing the teeth to be retained in the front and back surfaces of the layers 96, 100 and the lower assembly 106. In the example shown, the upper ends of the plates 128, 130 extend above the joint 116, and the lower ends of the plates 128, 130 extend beneath the joint 118. The width of the plates 128, 130 extend substantially across the width of the composite assembly 94.

Figure 16:
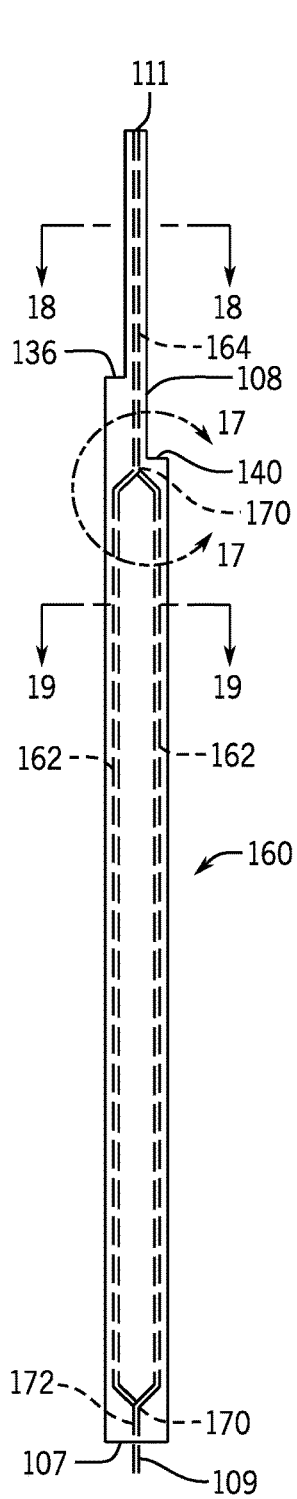
FIG. 16 is a front view of an additional embodiment of a unitary lower assembly.
Figure 17:
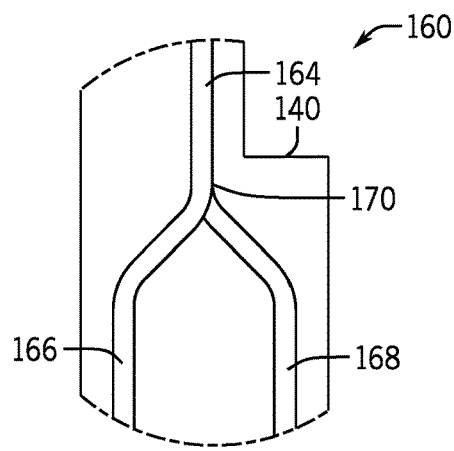
FIG. 17 is an enlarged detail view taken along line 17-17 of FIG. 16.
Figure 18:
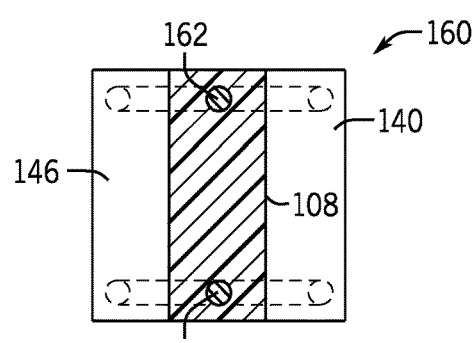
FIG. 18 is an enlarged sectional view taken along line 18-18 of FIG. 16.
Figure 19:
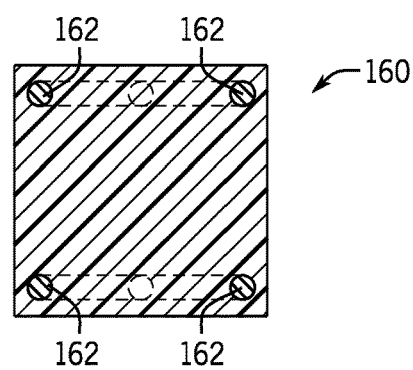
FIG. 19 is an enlarged sectional view taken along line 19-19 of FIG. 16.

FIGS. 16-19 depict a still further embodiment of a lower assembly 160 as may be used in connection with embodiments of the assemblies as presently disclosed. It will be recognized that like reference numerals are used in FIGS. 16-19 as in other previously described figures to denote like structures. This is done for the purpose of conciseness and to highlight features shown in FIGS. 16-19. It will be recognized that various combinations of features of the embodiments as disclosed in the present application may be used while remaining within the scope of the present disclosure. In an exemplary embodiment, at least a portion of the lower assembly 160 includes at least four reinforcing rods 162. As best depicted in FIGS. 16, 17, and 19 in an area between the lower end 107 and the upper end 111, and particularly below ledges 136 and 140, two reinforcement rods 162 angle away from the center of the lower assembly 160 and run parallel to one another along a portion of the length of the lower assembly 160. In an exemplary embodiment, the center of the lower assembly 160 is approximated by the center region 108. In an exemplary manufacture of an exemplary embodiment as disclosed herein, the plastic and/or composite material of the lower assembly 160 may exemplarily be cast or molded about the reinforcing rods 162.

FIG. 17 is an enlarged view of a portion of FIG. 16 as denoted by line 17-17 in FIG. 16. In FIG. 17, the reinforcing rods 162 angle away from a rod upper portion 164, which is exemplarily aligned along a center of the lower assembly 160 and center region 108. In the embodiment depicted, the reinforcing rods 162 angle away at a 45 degree angle. However, it will be recognized that this angle may be within a variety of other angles including 20 degrees, 70 degrees or other angles therebetween. Additionally the angles may be between 10-80 degrees or other angles. In one embodiment, one of the reinforcing rods 162 is an elongated rod 166 that extends the entire length of the lower assembly 160, and may exemplarily end at the lower end in the projections 109. The elongated rods 166 thus make up the upper rod portion 164. A support rod 168 connected at connecting points 170, which may exemplarily be end welds, to the elongated rod 166 and extend within at least a portion of the lower assembly 160. The support rod 168 may end at connection point 170 at a lower portion 172 of the elongated rod 166. FIG. 18 is a sectional view taken along line 19-19 and depicts the two reinforcing rods 162 extending within the center region 108. FIG. 19 is a sectional view taken along line 19-19 and depicts four reinforcing rods 162 extending within the lower assembly 160. In an exemplary embodiment, the reinforcing rods 162 as depicted in FIG. 19 may be located ¾ inch from the exterior sides of the lower assembly 160, although this is not intended to be limiting. In still further embodiments, one or more of the reinforcing rods 162 may include one or more bends (not depicted) such as exemplarily depicted in FIG. 13 and described above. In another embodiment (not depicted), both rods continue through the center region as a rod pair. In a still further embodiment, all four of the reinforcing rods may extend as projections 109 out from the lower end 107.

Figure 20:
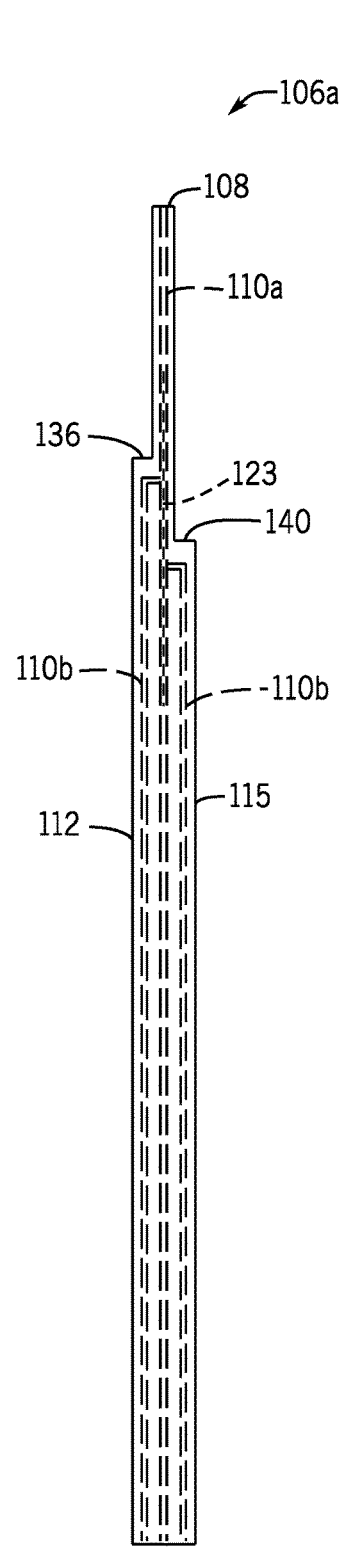
FIG. 20 is a front view of another embodiment of a unitary lower assembly.
Figure 21:
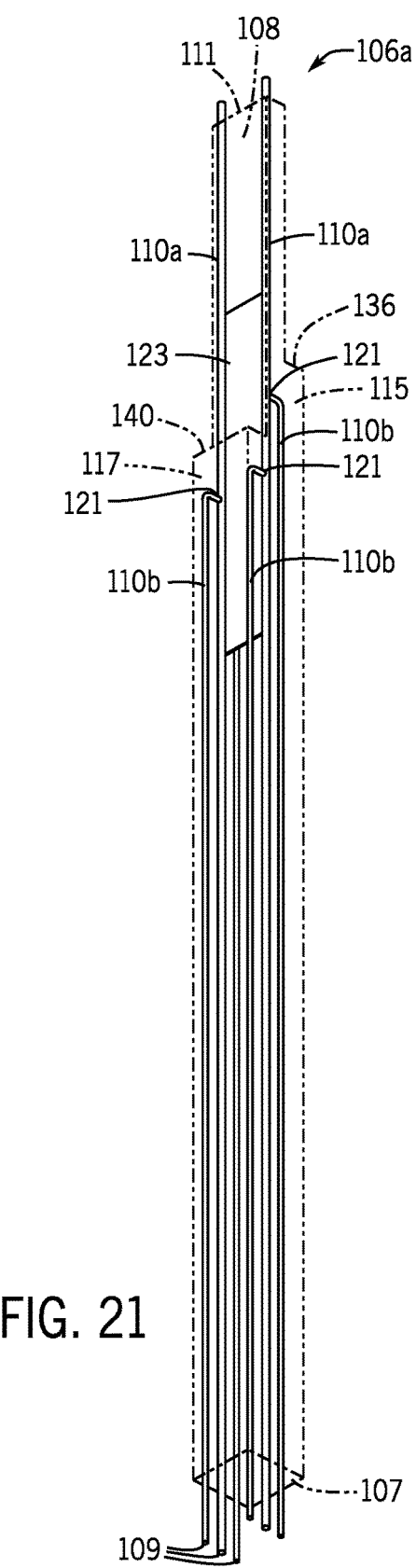
FIG. 21 is a perspective view of another embodiment of a unitary lower assembly.
Figure 22:
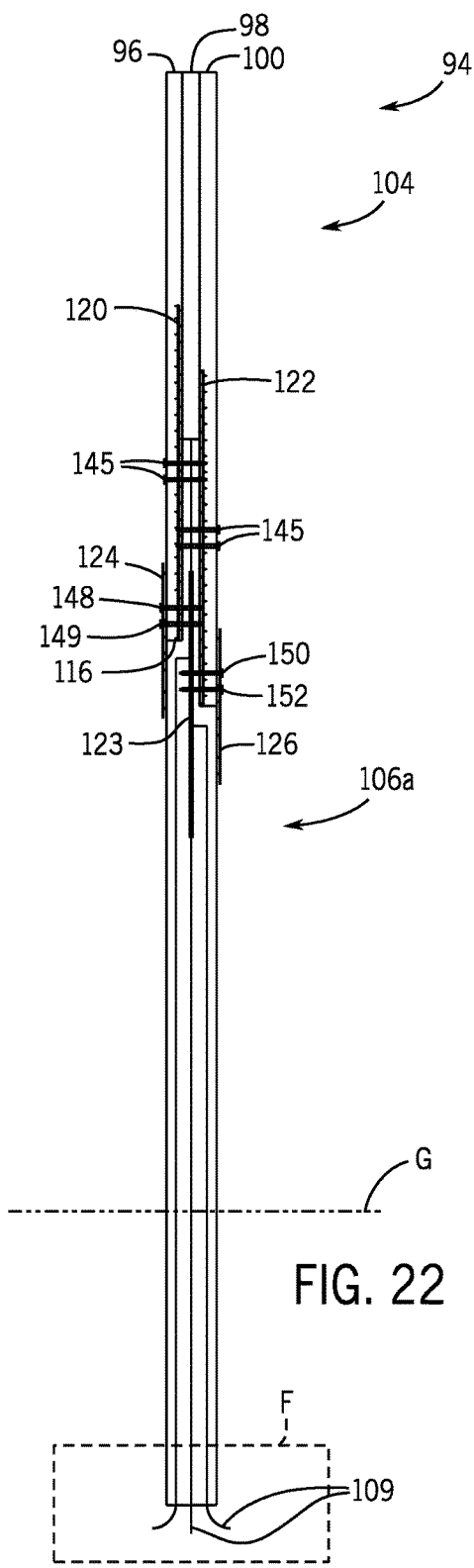
FIG. 22 is a front view of one embodiment of a composite assembly having a unitary lower assembly in accordance with the present disclosure.

FIG. 20 depicts an embodiment of the unitary lower assembly 106a having multiple reinforcing rods 110, including center reinforcing rods 110a and side reinforcing rods 110b. One or more center reinforcing rods 110a extend longitudinally along the central region 108 of the unitary lower assembly 106a. As depicted in FIGS. 21 and 22, the center reinforcing rods 110a may further extend out of the central upper end 111 of the central region 108, which can provide further strength at the attachment joint 114 between the lower end 132 of a central layer 98 of the upper elongated portion 102. Alternatively or additionally, the one or more center reinforcing rods 110 may extend out of the flat lower end 107 of the unitary lower assembly 106a in order to form one or more projections 109, which can facilitate structural attachment to the footing F. The central region 108 may be provided with two center reinforcing rods 110a extending the length of the center region 108 and connected by a center plate 123 between the two center reinforcing rods 110a. For example, the center plate 123 may be comprised of metal and may be welded to the center reinforcing rods 110a, which may exemplarily be constructed of rebar, such as one-half inch diameter steel rods.

In accordance with the description above, the unitary lower assembly 106a may be provided with two side regions 115 and 117 on either side of the central region 108. An upper end of each of the side regions 115 and 117 may terminate in a flat ledge, with side region 115 terminating at ledge 136 and side region 117 terminating in ledge 140. The ledges 136 and 140 are at a lower position than the central upper end 111, and are at staggered heights with respect to one another, with ledge 136 being at a higher point than ledge 140, such that the unitary lower assembly 106a has a teared upper end with each region 111, 115, 117 having an upper end terminating at a different height.

The side regions 115, 117 may each be provided with a side reinforcing rod 110b therein. The side reinforcing rods 110b may each have an upper end connecting at a rod joint 121 with one of the center reinforcing rods 110a. As pictured in FIG. 21, each side region 117 may house two side reinforcing rods 110b, one extending off of each of the two center reinforcing rods 110a. Accordingly, each center reinforcing rod 110a has two side reinforcing rods 110b extending therefrom, one into each side region 115, 117. The side reinforcing rods 110b in the side region 115 may be longer and join with the center reinforcing rod 110a at a higher point than the side reinforcing rods 110b in the other side region 117. The side reinforcing rods 220b may extend at approximately a 90° angle from the rod joint 121 with the center reinforcing rod 110a. The side reinforcing rods 110b may then bend at another 90° angle such that they generally run parallel with the center reinforcing rods 110a.

The side reinforcing rods 110b may also extend out of the flat lower end 107 of the unitary lower assembly 106a in order to form projections 109, which may further facilitate connection of the unitary lower assembly 106a to the footing F. FIG. 22 demonstrates this arrangement. The side reinforcing rods 110b may be of any metal or other construction which may provide structural reinforcement to the unitary lower assembly 106a. In an exemplary embodiment, the side reinforcing rods 110b may be comprised of rebar, such as one-half inch steel bar. In another embodiment, the side reinforcing rods 110b may be comprised of a thinner steel rod than the center reinforcing rods 110a, such as the center reinforcing rods 110a being one-half inch steel rods and the side reinforcing rods 110b being one-third inch steel rods. FIG. 22 depicts the unitary lower assembly 106a of FIG. 21 joined with the upper assembly 104, which is comprised of upper elongated portions 96, 98, and 100. The upper elongated portions, or layers, 96, 98, and 100 are connected together via connectors plates 120, 122, as is described above. In addition to the connector plates 120, 122, the connector arrangements which connect the upper assembly 104 and the unitary lower assembly 106a further include splice plates 124 and 126, screw fasteners 148 and 149 to fasten the splice plate 124 to the exterior site faces of the layer 96 and the unitary lower assembly 120 across joint 116, and screw fasteners 150 and 152 that fasten splice plate 126 to the exterior site faces of the layer 100 and the unitary lower assembly 106a across joint 118. In the depicted embodiment, screw fasteners 148 and 149 go through the splice plate 26 and the connector plate 120 to penetrate the central region 108 of the unitary lower assembly 106a to engage the center plate 123. Similarly, screw fasteners 150 and 152 go through splice plate 126, elongated layer 100, center region 108, and engage the center plate 123. Thereby, the connector arrangement engages the center plate 123, which provides additional stability to the joint of the unitary lower assembly 106a and the upper assembly 104. As shown in FIG. 22, the connector arrangement may further include additional screw fasteners 145 that penetrate two or more of the elongated portions 96, 98, 100 and the connector plates 120, 122 there between, and further attach to the central region 108 of the unitary lower assembly 106a. Four additional screw fasteners 145 are shown, with two on each lateral side of the upper assembly 104. Each set of two screw fasteners go through a respective elongated portion 96, 100 and penetrate the center ply tongue that makes up the upper portion of the center region 108 (the portion of the center region 108 between the ledge 136 and the central upper end 111). In one exemplary embodiment, the screw fasteners 145, 148, 149, 150, 152 may be 5/16 inches by 4 inch structural screws.

The upper assembly 104 is made of wood, such as untreated wood, and the unitary lower assembly 106a is a unitary construction formed of any material other than wood. In one embodiment, the unitary lower assembly 106a is comprised of a solid plastic material or of a composite plastic material. For example, the unitary lower assembly 106a may be a solid plastic material made of curbside tailings and/or other industrial plastic waste material, which provides a useful application for material that would otherwise be discarded in landfills. In one exemplary embodiment, the solid plastic material is heated and the unitary lower assembly 106a is constructed by molding the plastic material around the reinforcing rod(s) 110, such as center reinforcing rods 110a and side reinforcing rods 110b.

Figure 23:
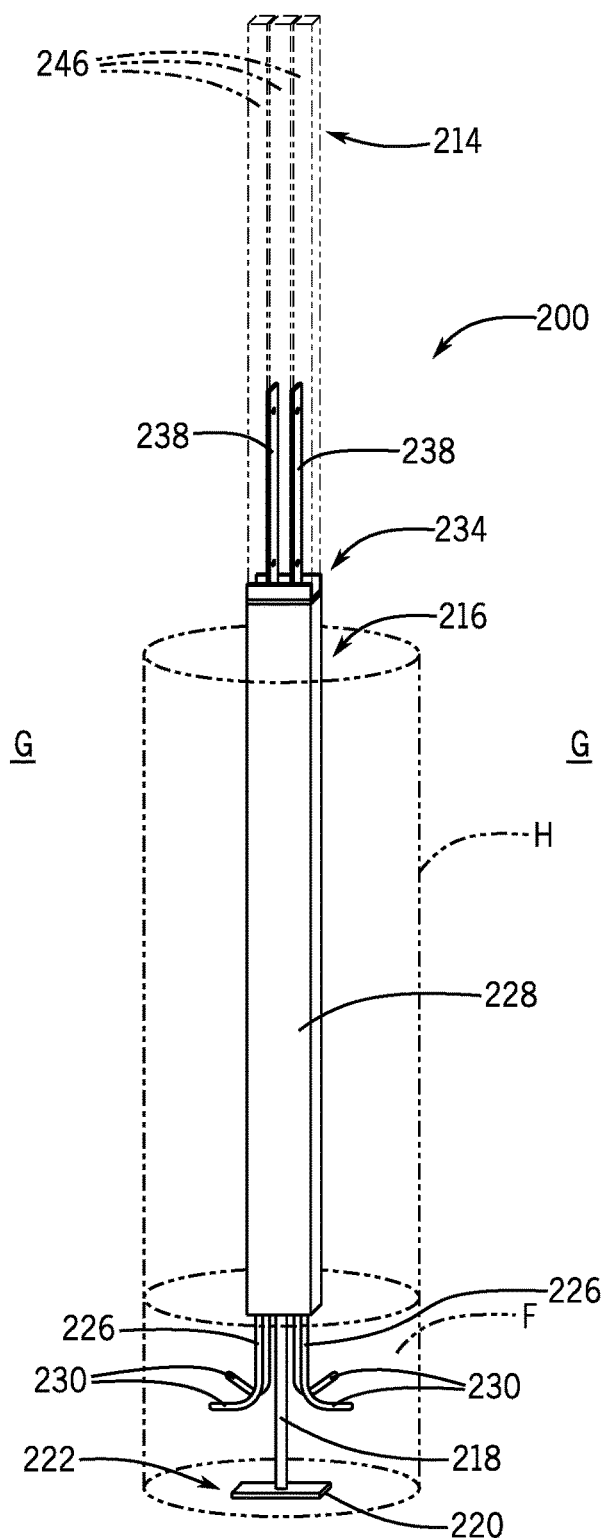
FIG. 23 diagrammatically depicts a composite assembly installed within a hole in the ground.

FIG. 23 diagrammatically depicts an exemplary embodiment of a composite assembly 200 positioned within a hole H in the ground G. The composite assembly 200 includes an upper assembly 214 which is exemplarily constructed of a plurality of laminated boards to form a wooden column. The boards of the upper assembly 214 may be secured to one another in the manner as described above. The composite assembly 200 further includes a lower assembly 216 which is designed for ground contact and is exemplarily constructed of a combination of metal and plastic as described herein.

The lower assembly 216 exemplarily includes a body 228 and an adjustment leg 218. The adjustment leg 218 is frictionally secured to the body 228 at a center hole 242 as described in further detail herein. The adjustment leg 218 terminates in a foot 220 that is configured to engage the bottom 222 of the hole H. The foot 220 engages the ground at the bottom 222 of the hole H to support the lower assembly 216 while a footing F, exemplarily concrete, is poured around at least a portion of the lower assembly 216. Support rods 226 which are exemplarily steel rebar, extend out of the bottom of the body 228 of the lower assembly 216. The support rods 226 may be bent into projections 230 which further are surrounded by the footing F which improves securement of the lower assembly 216 to the footing F. The footing F may be poured to any height along the lower assembly 216 and in embodiments wherein the footing F stops short of the ground level, the remaining portion of the hole 212 may be filled in with gravel and/or dirt.

In an exemplary embodiment, the body 228 is constructed of a plastic material. In a still further exemplary and non-limiting embodiment, the body 228 is constructed of high molecular weight polypropylene (HMWPE). In another exemplary and non-limiting embodiment, the body 228 is constructed with at least 66% polypropylene (PP) and at least 9% low density polyethelyene (LDPE). A still further exemplary embodiment may include 15% fiberglass shorts and/or 1% color added to the mixture. In exemplary embodiments, this may include some or all the body 228 being constructed of recycled plastic.

In a still further embodiment, at least a portion of the lower assembly 216 comprises wood. In such an embodiment, the lower assembly may be constructed of a plurality of elongated layers for example with the body 228 as a center layer sandwiched between two opposed wooden boards. In another exemplary embodiment, the body 228 may be a plastic insert inserted into a wooden lower assembly, the insert comprising the center hole within which the adjustment leg 218 is frictionally held as described in further detail herein. In a still further exemplary embodiment, the body 228 may be a plastic insert secured to the interior of a concrete lower assembly, the plastic insert also comprising the center hold as described herein within which the adjustment leg 218 is frictionally held.

Figure 24:
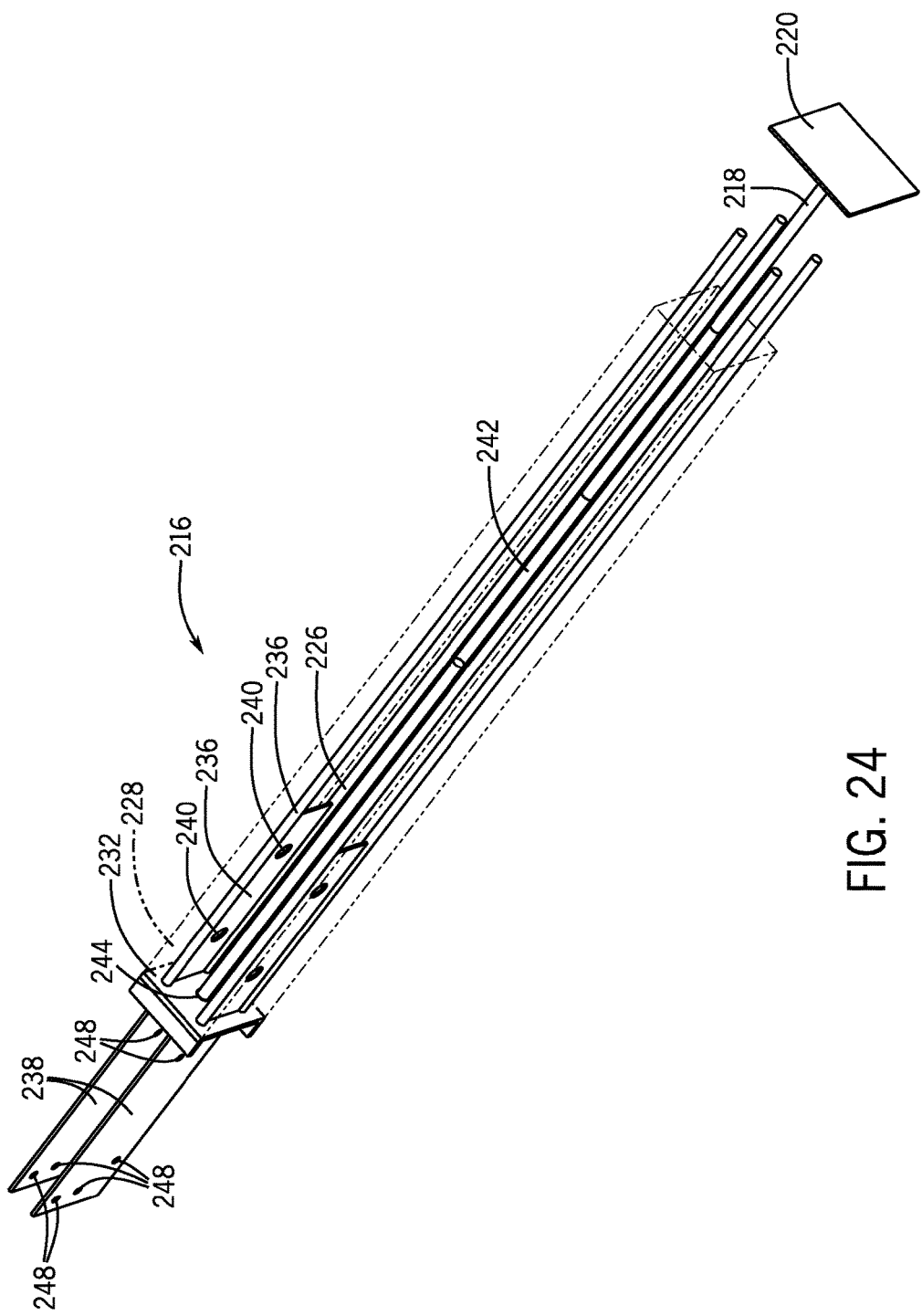
FIG. 24 depicts an exemplary embodiment of a lower assembly.

FIG. 24 is a perspective view of an exemplary embodiment of the lower assembly 216, depicting the body 228, which is exemplarily constructed of plastic, in phantom. In an exemplary embodiment, the connection bracket 234 includes connection blades 238, bottom plate 232, support rods 226, and support plates 236. The connection bracket 234 is assembled exemplarily by welding. The support rods 226 are secured, exemplarily by welding to the bottom plate 232 of the connection bracket 234. The support rods 226 extend along the length of the body 228 to exit the body 228 at the lower end thereof.

Figure 25:
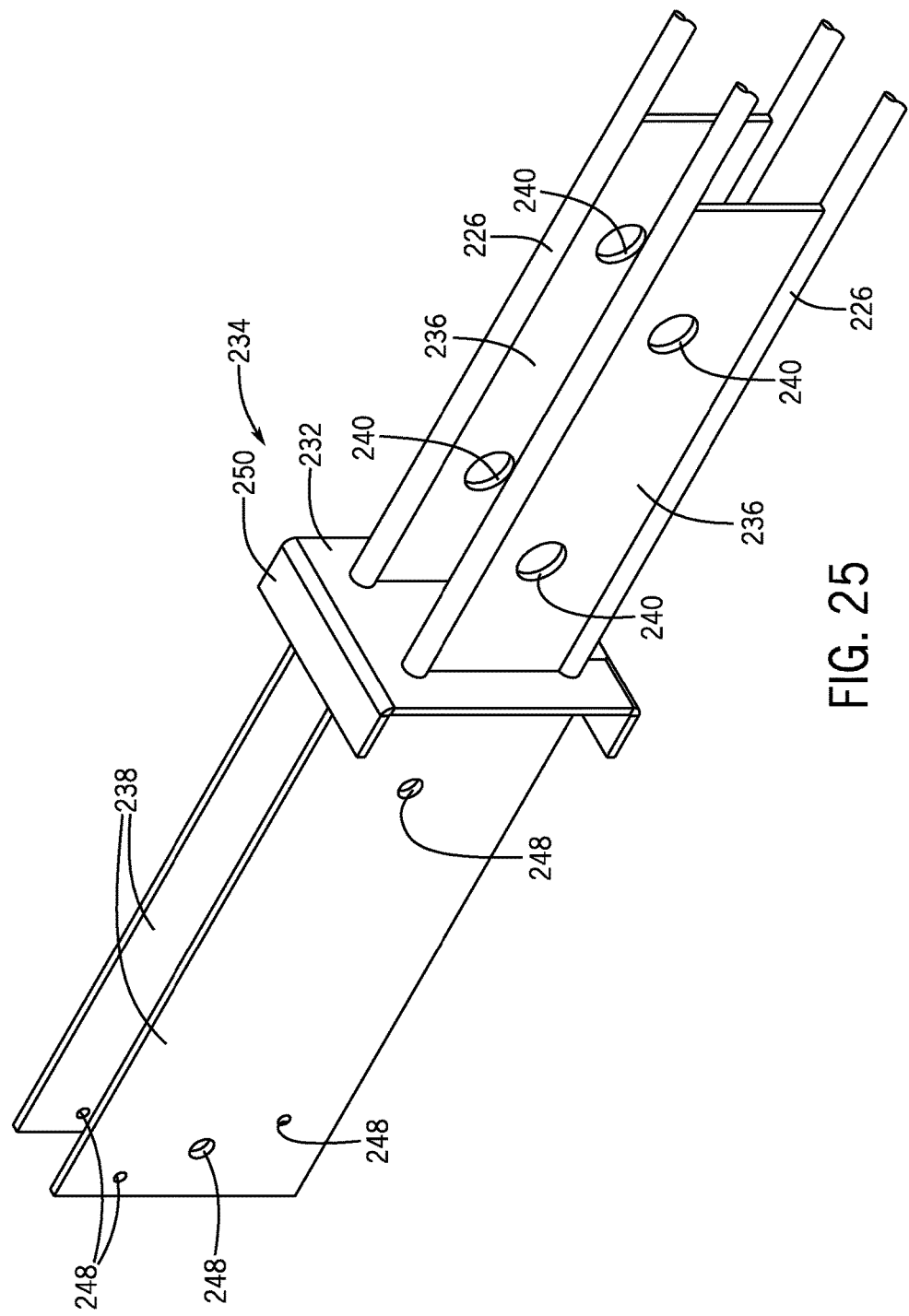
FIG. 25 is a perspective view of a first embodiment of a connection bracket.

The support plates 236 extend between adjacent support rods 226. Exemplarily, the support plates 236 are arranged in a direction parallel to the wooden boards of the upper assembly 214, as well as to the connection blades 238 of the connection bracket 234, as will be described in further detail herein. In a still further exemplary embodiment, the support plates 236 and support rods 226 may be positioned radially interior or exterior of the connection blades 238 from the center hole 242. While in other embodiments, the support plates 236 and support rods 226 are aligned with the connection blades 238. In the embodiment depicted in FIGS. 24 and 25, the support rods 226 and the support plates 236 are positioned radially outward from the center hole 242 or in the direction towards the exterior of the body 228 from the connection blades 238. Holes 240 through the support plates 236 help to facilitate connection between the column 228 and the support plates 236 by providing a space through which the plastic material of the body 228 can flow and extend. This helps the manufacturing process (e.g. injection molding) of the lower assembly by providing a path for the plastic around and through the support plates 236. Also, when hardened, the plastic through the support plates 236 further secures the body 228 and the support plates 236 and support rods 226 together. Material of the body 228 extending through the holes 240 in the support plates 236 thus helps to improve the connection between the plastic body 228 and the metal insert of the connection bracket 234.

The body 228 further includes center hole 242 that exemplarily extends along the entire length of the body 228. In an embodiment, the center hole 242 is cast or molded into the column 228 while in another embodiment, the center hole 242 may be machined into the column as a separate manufacturing step. The center hole 242 is exemplarily smaller in diameter than the adjustment leg 218. Due to the difference in diameter, the adjustment leg 218 can be positioned within the center hole 242 and held in that position by a friction fit between the material of the body 28 and the adjustment leg 218. In an exemplary embodiment, the exterior of the adjustment leg 218 may further include ribbing and/or surface texture facilitates friction fit between the adjustment leg 218 and the material of the body 228 within which the center hole 242 is formed. Additionally, a plastic, malleable, deformable, or resilient property of the material of body 228 further increases the friction between the body 228 and the adjustment leg 218.

The friction fit between the body 228 and the adjustment leg 218 is exemplarily strong enough to support the weight of the entire lower assembly 216 such that the adjustment leg 218 can be moved to a desired position between the bottom plate 232 of the connection bracket 234 and the foot 220. In an exemplary and non-limiting embodiment, the body 228 may be 48 includes long and the adjustment leg 24 includes long. Therefore, exemplary embodiment may be adjustable for example between 54 includes and 66 inches while other embodiments may be dimensioned to be adjustable along other ranges. When the lower assembly 216 is positioned in the hole, the foot 220 engages the ground at the bottom of the hole and the bottom plate 232 of the connection bracket 234 is located at the predetermined position above the foot 220 established by the friction fit between the adjustment leg 218 and the body 228. The friction fit between the adjustment leg 218 and the column 228 is further strong enough to support the lower assembly 216, and in particular to support the connection bracket 234 and body 228, from moving downward into the holw, while the footing F is poured and set, cured, or partially cured about at least a portion of the lower assembly 216. In an exemplary embodiment, the footing F extends upwards to cover the projections 230. In another exemplary embodiment, the footing 224 extends upwards to cover at least a portion of the body 228.

In an exemplary embodiment, the center hole 242 is further tapered along its length to facilitate ease of insertion of the adjustment leg 218 into the center hole 242, and to further increase the friction fit as the adjustment leg 218 is inserted further into the center hole 242. In a merely exemplary and non-limiting embodiment, the center hole 242 may taper from a dimension nominally equal to or greater than the diameter of the adjustment leg 218 at the lower end of the body 228 to a diameter exemplarily 75 percent or less of that of the diameter of the adjustment leg 218 at the upper end of the body 228. In a still further embodiment, the center hole 242 only tapers along half of the length of the body 228 or less. This has been found to help to ease insertion of the adjustment leg 218 into the center hole 242 without adversely impacting the friction fit. In a further exemplary and non-limiting embodiment, the center hole 242 may be ¾" diameter at the bottom of the body 228. The center hole 242 may taper over the first four inches of the center hole 242 to a diameter of ¹¹⁄₁₆", and further tapers to ²¹⁄₃₂" at a distance of sixteen inches from the bottom of the body 228. It will further be recognized that in an embodiment, the dimension above may be nominal dimensions fro initial casing or molding of the body, while as the material of the body cures and hardens (in the example of injection molding) the effective diameter of the center hold 242 may shrink from these dimensions. In an embodiment, the adjustment leg 218 has a nominal size of ⅝" diameter steel rod; however, the steel rod may include ribbing that extends the effective diameter of the adjustment leg. In still further embodiments, the diameter of the adjustment leg 218 and/or center hold 242 (including tapered regions) may be selected to provide the friction fit as described herein. The larger diameter of the center hole 242 at the bottom of the body 228 facilitates dry inserting the adjustment leg into the center hole 242 before applying a force to the bottom end (e.g. at the foot plate 220) to position the adjustment leg into the body 228.

In a still further exemplary embodiment, the bottom plate 232 further includes a hole 244 in alignment with the center hole 242. In an exemplary embodiment, the adjustment leg 218 is inserted into the lower end of the body 228. Installation personnel may decrease the distance between the foot 220 and the bottom plate 232 by applying a force (e.g. with a hammer) to the foot 220 to move the adjustment leg into the hole 242 through the body 228. In adjusting the lower assembly 216 the distance between the bottom pate 232 and the foot 220 may be increased by inserting a rod (not depicted) through the hole 244 into the center hole 242 at the top of the body 228 to engage a top end of the adjustment leg 218. A force applied to this rod will push the adjustment leg 218 out of the column 228, increasing the distance between the bottom plate 232 and the foot 220. In exemplary embodiments, it has been discovered that this adjustment may occur at least more than once while maintaining the structural integrity of the friction fit between the adjustment leg 218 and the body 228.

Figure 26:
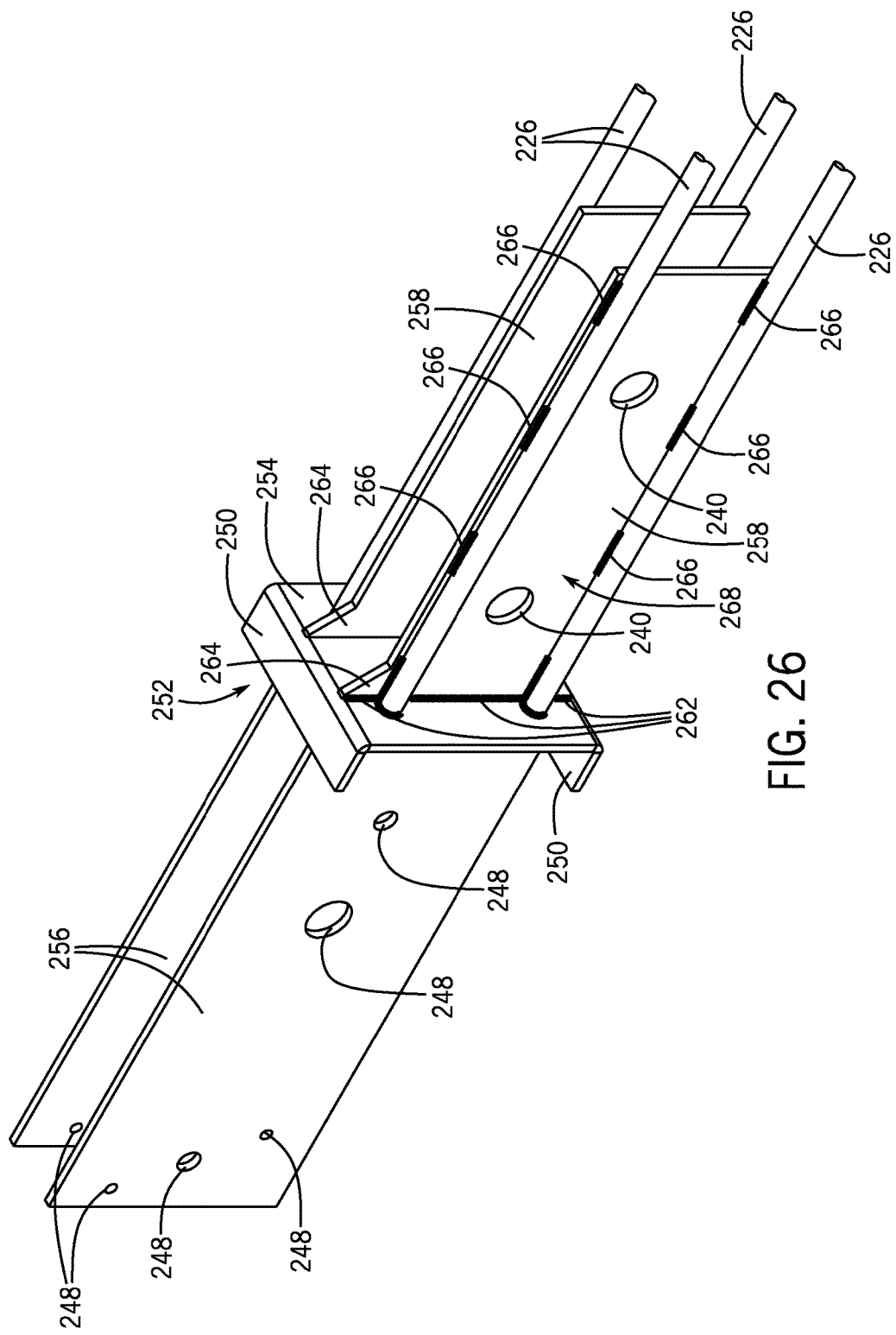
FIG. 26 is a perspective view of a second embodiment of a connection bracket.

As best depicted in FIG. 26 and with further reference to FIG. 23, the connection bracket 234 facilitates the connection between the lower assembly 216 and the upper assembly 214. As previously noted, the upper assembly 214 may be a wooden column formed of a plurality of laminated boards 246. The laminated boards 246 are secured to the connection bracket 234 by the connection blades 238. The connection blades 238 are configured to extend between the laminated boards 246 of the upper assembly 214. In an exemplary embodiment, grooves are cut through the laminated boards at the interface between adjacent laminated boards in the dimension of the connection blades 238. In an exemplary embodiment, the connection blades 238 may be 14 inches long and ⅜ of an inch thick. These connection blades 38 may extend the entire nominal width of the boards of the upper assembly 216, or in embodiments may extend beyond the widths of the boards. The boards of the upper assembly 216 are secured to the connection bracket 234 by a combination of bolts or screws which extend respectively through the boards of the upper assembly and through the connection blades 238 at pre-located and drilled holes 248. The boards of the upper assembly are positioned such that the respective ends of the boards abut the bottom plate 232. Lips 250 extend from the bottom plates 232 exterior of the connection blades 238. The lips 250 engage the lower assembly 216 along the bottoms of the narrow faces of the boards of the upper assembly and further help to secure the upper assembly 214 to the lower assembly 216. It will be recognized that other forms of connection may be used on other embodiments while remaining within the scope of the present disclosure.

Figure 27:
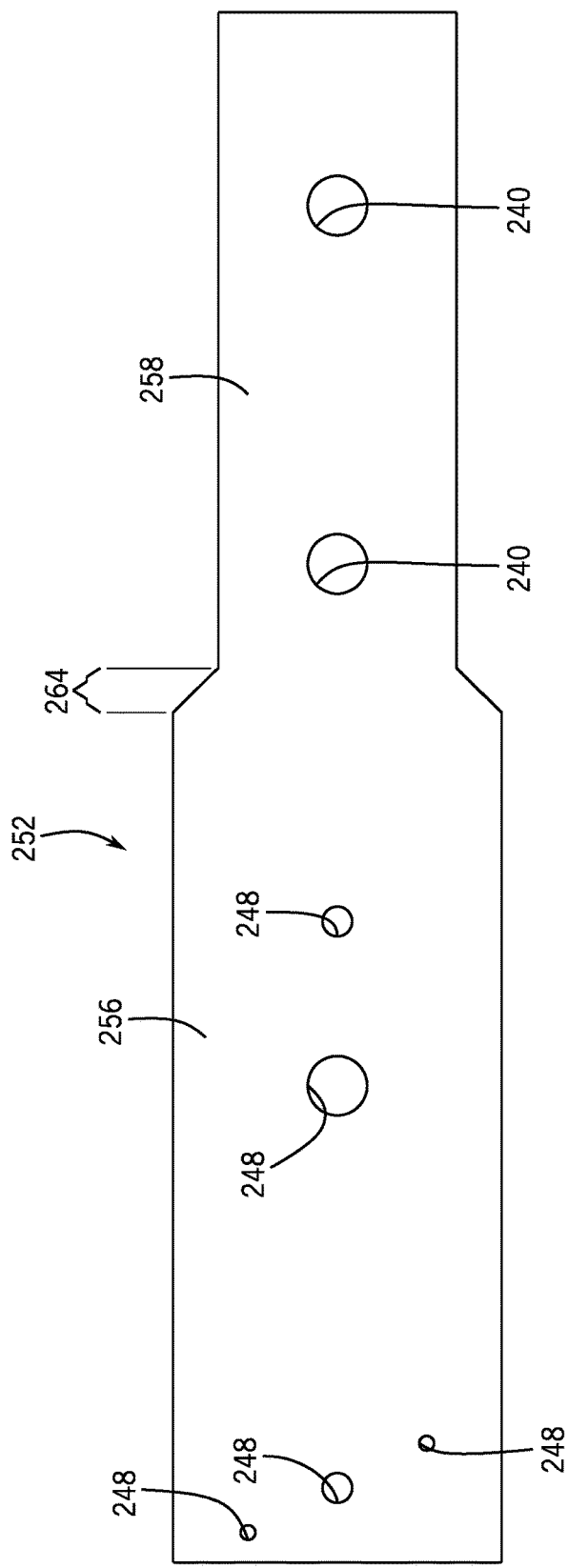
FIG. 27 depicts an exemplary embodiment of a connection plate.
Figure 28A:
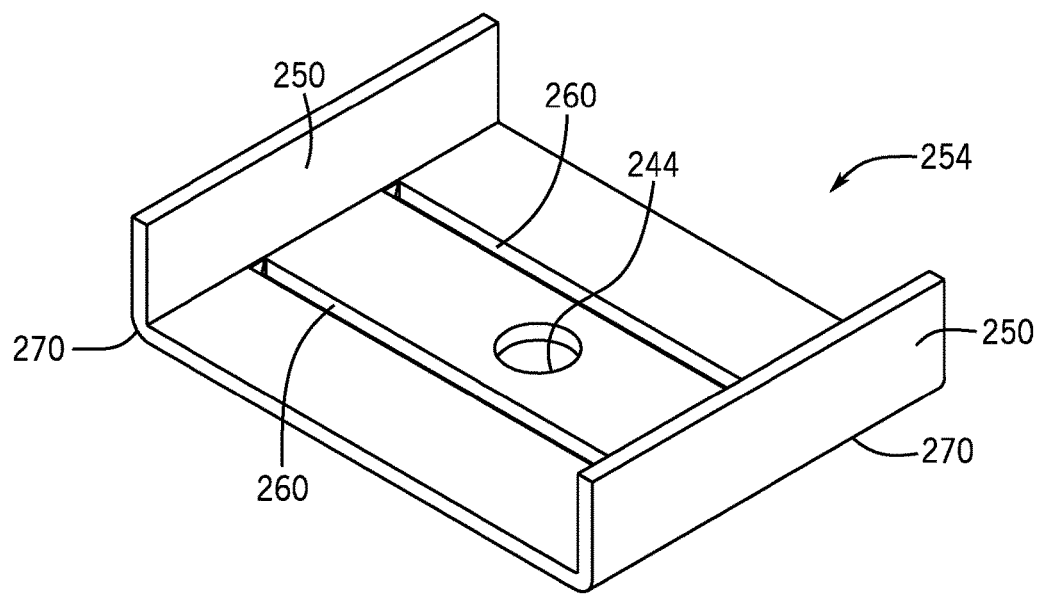
FIGS. 28A and 28B depict an exemplary embodiment of a bottom plate.
Figure 28B:
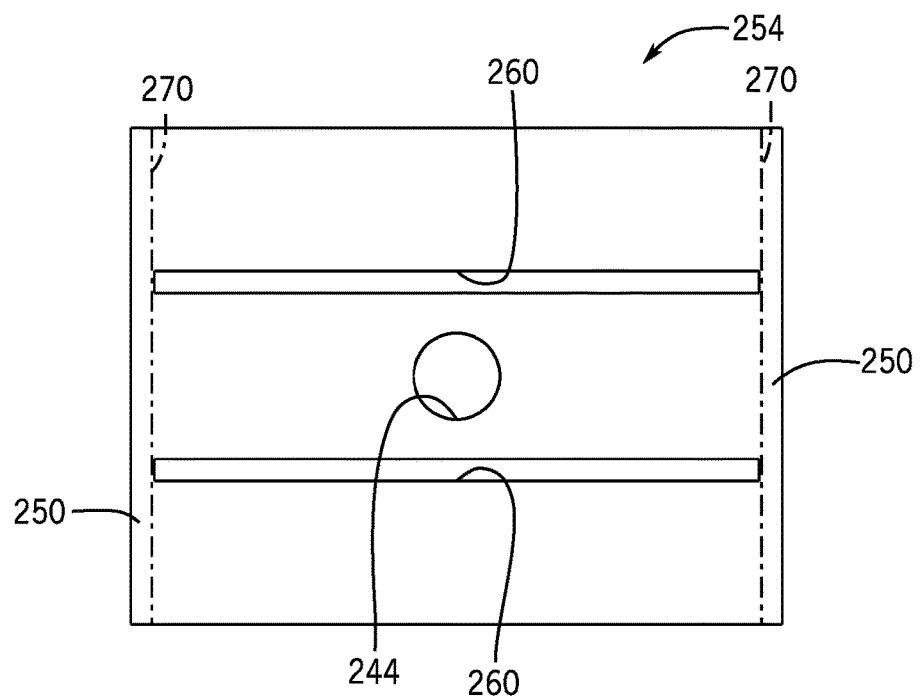

FIG. 26 is a perspective view of a still further exemplary embodiment of a connection bracket 252. It will be recognized that the connection bracket 252 includes some similar features as depicted and described above with respect to connection bracket 234 in FIGS. 23-25. Like reference numerals are used in the description herein to reference similar features between the two exemplary embodiments. The connection bracket 252 is exemplarily constructed of connection plates 252, a bottom plate 254, and the support rods 226. FIG. 27 is a detailed depiction of an exemplary embodiment of a connection plate 252 and FIGS. 28A and 28B are detailed depictions of an exemplary embodiment of the bottom plate 254.

The connection plate 252 includes the connection blade 256 and the support plate 258. In the embodiment depicted, the connection blade 256 and the support plate 258 are a unitary piece. Exemplarily, the connection blade 256 is constructed of steel. The connection plates 252 extend through slots 260 through the bottom plate 254 and are exemplarily secured thereto by welds 262. Thus, in part because of their unitary construction in the connection plate 252, the connection blade 256 and the support plate 258 are co-linear across the bottom plate 254.

The connection plates 252 further include a transition 264 which exemplarily tapers the connection plate 252 from the width of the connection blade 256 to the width of the support plate 258. As previously noted, embodiments of the connection blades 256 are exemplarily the nominal width of the wooden boards (not depicted) to which the connection blades 256 are secured. The support plate 258 is narrower such that the support plate 258 is entirely within the body (see e.g. body 228 in FIG. 24). In FIGS. 26 and 27, the transition 264 is depicted as extending below (e.g. towards the support plate 258) the bottom plate 254. In an additional exemplary embodiment, the transition 264 may be located above the bottom plate 254, or may extend through the bottom plate 254 with a portion of the transition 264 on either side of the bottom plate 254. It will be recognized that a dimension of the slots 260 through the bottom plate 254 may be predetermined based upon a width dimension of the connection plate 252 where it is connected to the bottom plate 254.

Support rods 226 are connected to the bottom plate 254 and to the support plates 258, exemplarily by welds 266. In an exemplary embodiment, the support rods 226 are connected to outer surfaces 268 of the support plates 258. By locating and connecting the support rods 226 in this position, the support rods 228 are located apart from one another and towards the exterior of the body (e.g. body 228 in FIG. 24). This position of the support rods 228 improves their reinforcing function of the body, while also distancing them from the center hole (e.g. center hole 242 in FIG. 24) as described above.

FIGS. 28A and 28B depict an exemplary embodiment of the bottom plate 254. In particular, FIGS. 28A and 28B show the slots 260 through the bottom plate 254 and the hole 244 which, when the lower assembly 216 is assembled aligns with center hole 242. FIG. 28A is a perspective view of the bottom plate 254. FIG. 28B is top view of the bottom plate 254 as it exemplarily appears during construction. In an embodiment, the bottom plate 254 is constructed of a sheet of metal in which the hole 244 and the slots 260 are cut. Then the lips 250 are formed by bending the metal at bends 270. In an exemplary embodiment, the slots 260 are aligned with the bends 270 to terminate at the bend 270 and the start of the lip 250. Thus, in an exemplary embodiment, the lips 250 are positioned directly exterior of the connection plates 252 when the connection bracket 234 is assembled.

This written description uses examples to disclose various embodiments including the best mode, and also to enable any person skilled in the art to make and use these embodiments. The patentable scope is defined by the claims and may extend to include other examples not explicitly listed that occur to those skilled in the art. Such other examples are intended to be within the scope of the claims if they have structural elements that do not differ from the literal language of the claim, or if they include equivalent elements with insubstantial differences from the literal languages of the claims. FIGS. 20-22 illustrate another embodiment of a composite assembly having a unitary lower assembly 106, such as may be made of a plastic material. FIGS. 23-28 depict still further embodiments of a composite assembly, and particularly a lower assembly 200 for use in a composite assembly. Various alternatives and embodiments are contemplated as being within the scope of the following claims, particularly pointing out and distinctly claiming the subject matter of the present disclosure.

The invention claimed is:

1. A composite assembly adapted for use in a building structure, the composite assembly comprising:
    a first elongated layer comprising a first upper elongated member and a first lower elongated member of a non-wood material connected in an end-to-end relationship at a first joint;
    a second elongated layer arranged in lengthwise contact to the first elongated layer;
    a first dual sided connector arranged between the first elongated layer and the second elongated layer at a position across the first joint such that the first dual sided connector simultaneously engages the first upper elongated member, the first lower elongated member and the second elongated layer;
    a second dual sided connector arranged between the first elongated layer and the second elongated layer at a position spaced apart from the first dual sided connector such that the second dual sided connector simultaneously engages the first elongated layer and the second elongated layer;
    wherein the first and second dual sided connectors each comprises:
  a unitary base plate having a first surface and a second surface;
    a first tooth pair extending outwardly from the first surface of the base plate, the first tooth pair comprising a first tooth and a second tooth, the first tooth and second tooth each having a vertical axis perpendicular to the first surface of the base plate, the first tooth and second tooth being twisted about the vertical axis; and
    a second tooth pair extending outwardly from the second surface of the base plate, the second tooth pair comprising a third tooth and a fourth tooth, the third tooth and fourth tooth each having a vertical axis perpendicular to the second surface of the base plate, the third tooth and fourth tooth being twisted about the vertical axis.

2. The composite assembly of claim 1 wherein the first upper elongated member is a wooden board and the second elongated layer comprises a wooden board.

3. The composite assembly of claim 1, wherein the first upper elongated member is a wooden board and the second elongated layer comprises the non-wood material.

4. The composite assembly of claim 3, wherein the second elongated layer comprises a second upper elongated member and a second lower elongated member of the non-wood material connected in an end-to-end relationship at a second joint, wherein the second joint is spaced apart from the first joint.

5. The composite assembly of claim 4, further comprising a third dual sided connector arranged between the first elongated layer and the second elongated layer at a position across the second joint such that the third dual sided connector simultaneously engages the second upper elongated member, the second lower elongated member and the first elongated layer.

6. The composite assembly of claim 5, wherein the second dual sided connector simultaneously engages the first upper elongated member and the second upper elongated member and further comprising a fourth dual sided connector arranged between the first elongated layer and the second elongated layer and simultaneously engages the first lower elongated member and the second lower elongated member.

7. The composite assembly of claim 4, wherein the first lower elongated member and the second lower elongated member are constructed as a unitary construction of non-wood material.

8. The composite assembly of claim 1, further comprising:
    a third elongated layer arranged in lengthwise contact to the first elongated layer;
    a third dual sided connector arranged between the first elongated layer and the third elongated layer at a position across the first joint such that the third dual sided connector simultaneously engages the first upper elongated member, the first lower elongated member and the third elongated layer.

9. The composite assembly of claim 8, further comprising a fourth dual sided connector arranged between the first elongated layer and the third elongated layer at a position spaced apart from the third dual sided connector such that the fourth dual sided connector simultaneously engages the first elongated layer and the third elongated layer.

10. The composite assembly of claim 9, wherein the second dual sided connector simultaneously engages the first upper elongated member and the second elongated layer and the fourth dual sided connector simultaneously engages the first upper elongated member and the third elongated layer, and further comprising:
    a fifth dual sided connector arranged between the first elongated layer and the second elongated layer and simultaneously engages the first lower elongated member and the second elongated layer; and
    a sixth dual sided connector arranged between the first elongated layer and the third elongated layer and simultaneously engages the first lower elongated member and the third elongated layer.

11. The composite assembly of claim 10, wherein the first, second, and third elongated layers are all the same length and, the second elongated layer is a wooden board, and the third elongated layer is a wooden board.

12. The composite assembly of claim 11, wherein engagement between the first elongated layer, second elongated layer, and third elongated layer conceals the dual sided connectors from view.

13. The composite assembly of claim 12, wherein when a compressive force is applied to the first elongated layer, the second elongated layer, and the third elongated layer, the compressive force embeds the plurality of tooth pairs extending from the first, second, and fifth dual sided connectors into the first elongated layer and the second elongated layer and embeds the plurality of tooth pairs extending from the third, fourth, and fifth dual sided connectors into the first elongated layer and the third elongated layer.

14. The composite assembly of claim 13, wherein the compressive force further embeds the respective base plates of the first, second, and fifth dual sided connectors into the first elongated layer and the second elongated layer and embeds the respective base plates of the third, fourth, and sixth dual sided connectors into the first elongated layer and the second elongated layer.

15. The composite assembly of claim 11, wherein dimensions of the respective base plates of the dual sided connectors are smaller than dimensions of engaging surfaces between the first, second, and third elongated layers, such that the first, second, and third elongated layers conceal the dual sided connectors.

16. The composite assembly of claim 11, wherein the wooden boards of the second elongated layer and the third elongated layer comprise a wood grain and the teeth of the respective dual sided connectors are generally aligned with the wood grain.

17. A method of constructing a composite assembly for use in construction of a building, the method comprising:
providing a first elongated layer having a first elongated member with a first surface, a second elongated member of a non-wood material with a second surface and arranged in the first layer end-to-end at a first joint with the first elongated member, and a second elongated layer having a third elongated member with a third surface;
arranging the first and second surfaces opposite from the third surface;
providing a first dual sided connector across the first joint from the first surface to the second surface and in simultaneous engagement with the first, second, and third surfaces;
providing a second dual sided connector in simultaneous engagement with the first member and the third member;
providing a third dual sided connector in simultaneous engagement with the second member and the third member, wherein each dual sided connector comprises:
a unitary base plate having a first surface and a second surface;
a first tooth pair extending outwardly from the first surface of the unitary base plate, the first tooth pair comprising a first tooth and a second tooth, the first tooth and the second tooth each having a vertical axis perpendicular to the first surface of the base plate, the first and second tooth being twisted about their vertical axis; and
a second tooth pair extending outwardly from the second surface of the base plate, the second tooth pair comprising a third tooth and a fourth tooth, the third tooth and the fourth tooth each having a vertical axis perpendicular to the second surface of the base plate, the third tooth and fourth tooth being twisted about their vertical axis; and
applying a compressive force against the first, second and third elongated members to drive respective tooth pairs of the dual sided connectors into the first, second, and third elongated members.

18. The method of claim 17, wherein the first and third elongated members are wood.

19. The method of claim 18, further comprising aligning the teeth of the first and second tooth pairs with a grain of the wood of the first, second, and third elongated members.

20. The method of claim 17, further comprising:
providing a fourth elongated member of a non-wood material with a fourth surface and arranged in the second layer end-to-end at a second joint with the third elongated member, with the fourth surface opposite the second surface;
providing a fourth dual sided connector across the second joint from the third surface to the fourth surface and in simultaneous engagement with the second, third, and fourth surfaces, wherein the compressive force is applied against the fourth elongated member and drives respective tooth pairs of the fourth dual sided connector into the second, third, and fourth elongated members.

* * * * *